US008284742B2

(12) United States Patent
Seok et al.

(10) Patent No.: US 8,284,742 B2
(45) Date of Patent: Oct. 9, 2012

(54) RADIO MEASUREMENT PROCEDURE IN WIRELESS COMMUNICATION SYSTEM

(75) Inventors: Yong Ho Seok, Seoul (KR); Si Hoon Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 1154 days.

(21) Appl. No.: 12/125,822

(22) Filed: May 22, 2008

(65) Prior Publication Data

US 2009/0011768 A1    Jan. 8, 2009

(30) Foreign Application Priority Data

Jul. 6, 2007    (KR) .......................... 10-2007-0068298

(51) Int. Cl.
*H04W 4/00* (2009.01)
(52) U.S. Cl. ....................................................... 370/338
(58) Field of Classification Search .................. 370/332, 370/338, 337, 329; 455/452.2, 450, 437
See application file for complete search history.

(56) References Cited

U.S. PATENT DOCUMENTS

| 6,988,236 | B2 | 1/2006 | Ptasinski et al. |
| 7,164,671 | B2 | 1/2007 | del Prado et al. |
| 7,461,253 | B2 | 12/2008 | Braskich et al. |
| 7,676,676 | B2 | 3/2010 | Braskich et al. |
| 7,702,330 | B2 | 4/2010 | Alexander et al. |
| 7,796,557 | B2 * | 9/2010 | Xue et al. ...................... 370/332 |
| 7,801,104 | B2 | 9/2010 | Gaur |
| 7,995,546 | B2 | 8/2011 | Walker et al. |
| 2005/0009565 | A1 | 1/2005 | Kwak |
| 2005/0286480 | A1 | 12/2005 | Akiyama |
| 2006/0187871 | A1 | 8/2006 | Jones |
| 2006/0218271 | A1 | 9/2006 | Kasslin et al. |
| 2007/0097934 | A1 | 5/2007 | Walker et al. |
| 2007/0150387 | A1 | 6/2007 | Seubert et al. |
| 2007/0162751 | A1 | 7/2007 | Braskich et al. |

(Continued)

FOREIGN PATENT DOCUMENTS

| JP | 2008-533895 | 8/2008 |
| WO | 2006/097832 | 9/2006 |

OTHER PUBLICATIONS

IEEE Computer Society; "IEEE Standard for Information Technology—Telecommunications and information exchange between systems—Local and metropolitan area networks—Specific requirements, Part 11: Wireless LAN Medium Access Control (MAC) and Physical Layer (PHY) Specifications, Amendment 1: Radio Resource Measurement of Wireless LANs"; IEEE Standards; IEEE Std 802.11k-2008; Jun. 12, 2008.

(Continued)

*Primary Examiner* — Chandrahas Patel
(74) *Attorney, Agent, or Firm* — Lee, Hong, Degerman, Kang & Waimey

(57) ABSTRACT

There is provided a radio measurement procedure for station statistics measurements in wireless communication network. In the method a requesting station transmits to a requested station a triggered station statistics measurements request message including a group identity field which indicates the requested QoS statistics group and a triggered reporting field for QoS station counters which is used to specify trigger conditions comprising reporting triggers and QoS statistics thresholds for the corresponding reporting triggers. And the requesting station receives from the requested station a QoS station statistics measurements report message when the trigger conditions specified in the triggered reporting field for QoS station counters of the triggered station statistics measurements request message.

20 Claims, 15 Drawing Sheets

U.S. PATENT DOCUMENTS

| | | |
|---|---|---|
| 2008/0016350 A1 | 1/2008 | Braskich et al. |
| 2008/0026748 A1 | 1/2008 | Alexander et al. |
| 2008/0046719 A1 | 2/2008 | Kim et al. |
| 2008/0123577 A1 | 5/2008 | Jaakkola et al. |
| 2008/0170497 A1 | 7/2008 | Jeong et al. |
| 2008/0274698 A1 | 11/2008 | Li et al. |
| 2009/0154426 A1 | 6/2009 | Perraud et al. |
| 2010/0070767 A1 | 3/2010 | Walker et al. |
| 2010/0202315 A1 | 8/2010 | Kwak |

OTHER PUBLICATIONS

Mangold, S., et al.; "IEEE 802.11k: Improving Confidence in Radio Resource Measurements"; 16th IEEE Int'l Symposium on Personal, Indoor and Mobile Radio Communications (PIMRC'05); vol. 2, pp. 1009-1013; Sep. 11, 2005.

IEEE Computer Society; "Draft Amendment to Standard for Information Technology—Telecommunications and information exchange between systems—LAN/MAN—Specific requirements, Part 11: Wireless LAN Medium Access Control (MAC) and Physical Layer (PHY) Specifications, Amendment 7: Radio Resource Measurement of Wireless LANs"; IEEE Standards; IEEE Std 802.11k/D1.6; Feb. 2005.

"Part 11: Wireless LAN Medium Access Control (MAC) and Physical Layer (PHY) specifications; Amendment 6: Medium Access Control (MAC) Security Enhancements", IEEE Standard 802.11i, Jul. 2004.

* cited by examiner

| QoS STA Counter Trigger Condition (310) | dot11QoSFailed Threshold (311) | dot11QoSRetry Threshold (312) | dot11QoSMultiple Retry Threshold (313) | dot11QoSFrame Duplicate Threshold (314) |
|---|---|---|---|---|

| dot11QoSRTS Failure Threshold (315) | dot11QoSACK Failure Threshold (316) | dot11QoSDiscarded Threshold (317) | Measurement Count (318) | Trigger Timeout (319) |
|---|---|---|---|---|

| B0 | B1 | B3 | B4 |
|---|---|---|---|
| dot11RSNAStats CMACICVErrors | dot11RSNAStats CMACReplays | dot11RSNAStats BIPReplays | dot11RSNAStats RobustMgmt CCMPReplays |

| B5 | B6 | B7 | B8 |
|---|---|---|---|
| dot11RSNAStats TKIPICVErrors | dot11RSNAStats TKIPReplays | dot11RSNAStats CCMPDecryptErrors | dot11RSNAStats CCMPreplays |

| B0 | B1 | B3 | B4 |
|---|---|---|---|
| dot11RSNAStats CMACICVErrors | dot11RSNAStats CMACReplays | dot11RSNAStats BIPReplays | dot11RSNAStats RobustMgmt CCMPReplays |

| B5 | B6 | B7 | B8 |
|---|---|---|---|
| dot11RSNAStats TKIPICVErrors | dot11RSNAStats TKIPReplays | dot11RSNAStats CCMPDecryptErrors | dot11RSNAStats CCMPreplays |

RADIO MEASUREMENT PROCEDURE IN WIRELESS COMMUNICATION SYSTEM

CROSS-REFERENCE TO RELATED PATENT APPLICATIONS

This application claims the benefit of Korean Patent Application No. 10-2007-0068298 filed on Jul. 6, 2007 in the Korean Intellectual Property Office, the disclosure of which is incorporated herein in its entirety by reference.

BACKGROUND OF THE INVENTION

1. Field of the Invention

The present invention relates to a wireless communication system, and more particularly, to a radio measurement procedure for station (STA) statistics in a wireless communication system and a device supporting the radio measurement procedure.

2. Description of the Related Art

With development of information communication technologies, a variety of wireless communication technologies have been developed. A wireless LAN (WLAN) is a technology permitting wireless access to Internet in specific service areas such as home or companies or air planes by the use of portable terminals such as a personal digital assistant (PDA), a laptop computer, and a portable multimedia player (PMP) on the basis of a radio frequency technology.

These days, thanks to the increased availability of WLANs, portable terminal users such as laptop computer users are able to perform their tasks with increased mobility. For example, a user can take his laptop computer from his desk into a conference room to attend a meeting and still have access to his local network to retrieve data and have access to the Internet via one or more modems or gateways present on the local network without being tethered by a wired connection. Similarly, business travelers commonly use their portable terminals to gain access to their email accounts, to check if there is any unread email, and to read and send email.

In the initial WLAN technology, a data rate of 1 to 2 Mbps was supported by the use of frequency hopping, spread spectrum, and infrared communication using a frequency of 2.4 GHz in accordance with the IEEE 802.11. In recent years, with the development of the wireless communication technology, 54 Mbps in maximum can be supported by applying the orthogonal frequency division multiplex (OFDM) technology, etc. to the WLAN. In addition, the IEEE 802.11 has developed or is developing wireless communication technologies for improvement in quality of service (QoS), compatibility of an access point (AP) protocol, security enhancement, radio measurement or radio resource measurement, wireless access in vehicular environment, fast roaming, mesh network, inter-working with external networks, wireless network management, and the like.

In the radio resource measurement procedure, a STA observes the radio link performance and the radio environment and/or collects data measured by another STA. The radio resource measurement procedure is performed to understand the radio environment. For example, the STA can locally measure the radio environment or can request another STA for measuring one or more elements. The STA can receive a request for measuring one or more elements from another STA and can inform the STA of the measurement result. The radio measurement data acquired in the procedure can be used to manage the STA and can be provided to a higher protocol layer for various applications.

A variety of means can be used for the radio resource measurement in the wireless network. For example, beacon frames or measurement pilots having a predetermined format can be used for the radio resource measurement. A method of calculating a channel load or a noise histogram may be used therefor. A method using statistical information of STAs can be used for the radio resource measurement. In this case, values recorded in various counters of the STA or BSS (Basic Service Set) average access delay time can be contained in the statistical information.

SUMMARY OF THE INVENTION

In general, a STA includes plural counters for calculating accumulated values on various kinds of statistical information pieces (hereinafter, referred to as "STA statistic elements"). The STA statistical elements measured by the counters of the STA includes a transmitted fragment count, a multicast transmitted frame count, a failure count, a retry count, a multiple retry count, a frame duplicate count), an acknowledgement failure count, an RTS (Request To Send) success count, an RTS failure count), a discarded frame count), and a transmitted frame count. The STA statistical elements can include a robust security network association (RSNA) count. Hereinafter, a STA counter for measuring an RSNA count is referred to as an "RSNA counter".

In the wireless communication standards, various STA statistical elements are defined. Since some of the STA statistical elements are classified into STA statistical elements supporting the quality of service (QoS) and STA statistical elements not supporting the QoS for management, the number of kinds of the STA statistical elements may be still greater than described above. Accordingly, a systematic radio resource measurement procedure with high accuracy and efficiency and a radio resource measurement device therefor are required for exchange of information on the STA statistical elements.

A technical goal of the invention is to provide a radio measurement procedure for STA statistics that can efficiently manage wireless networks by permitting exchange of information on many kinds of STA statistical elements in a wireless communication system and a device supporting the radio measurement procedure.

Another technical goal of the invention is to provide a radio measurement procedure for a triggered STA statistical request/report that can permit exchange of information on one or more STA statistical elements only when a specific condition is satisfied in a wireless communication system and a device supporting the radio measurement procedure.

Still another technical goal of the invention is to provide a message constructing method for performing the above-mentioned radio measurement procedure for a triggered STA statistical request/report.

According to an aspect of the invention, there is provided a radio measurement procedure for station statistics measurements in wireless communication network, the radio measurement procedure comprising: transmitting to a requested station a triggered station statistics measurements request message including a group identity field which indicates the requested QoS statistics group and a triggered reporting field for QoS station counters which is used to specify trigger conditions comprising reporting triggers and QoS statistics thresholds for the corresponding reporting triggers; and receiving from the requested station a QoS station statistics measurements report message when the trigger conditions specified in the triggered reporting field for QoS station counters of the triggered station statistics measurements request message.

According to another aspect of the invention, there is provided a radio measurement procedure for station statistics measurements in wireless communication network, the radio measurement procedure comprising: receiving from a requesting station a triggered station statistics measurements request message including a group identity field which indicates the requested QoS statistics group and a triggered reporting field for QoS station counters which is used to specify trigger conditions comprising reporting triggers and QoS thresholds for the corresponding reporting triggers; measuring the requested QoS station statistics; and transmitting to the requesting station a QoS station statistics measurements report message when the trigger conditions specified in the triggered reporting field for QoS station counters of the triggered station statistics measurements request message.

According to further another aspect of the invention, there is provided a station for supporting radio measurement procedure for station statistics measurements in wireless communication network, the station comprising: a processor configured to generate and process frames; and a transceiver operably connected to the processor and configured to transmit and receive the frames for the processor, wherein the transceiver is configured to transmit to a requested station a request frame for triggered QoS station statistics measurements which is generated by the processor to include a group identity field indicating the requested QoS statistics group and a triggered reporting field being used to specify trigger conditions comprising reporting triggers and QoS thresholds for the corresponding reporting triggers; and receive from the requested station a QoS station statistics measurements report message when the trigger conditions specified in the triggered reporting field for QoS station counters of the triggered station statistics measurements request message.

According to further another aspect of the invention, there is provided a format of triggered reporting field included in measurement request element for station statistics measurements procedure in wireless communication network, the triggered reporting field comprising: a QoS station counter trigger condition subfield being a bit-field that specifies reporting triggers when requesting triggered station statistics reporting; and one or more QoS threshold subfields for specifying values representing the number of MSDUs to be used as the QoS threshold values for the corresponding reporting triggers, and wherein each of the QoS threshold subfields is present when the corresponding bit-field in the QoS station counter trigger condition subfield is set to 1.

BRIEF DESCRIPTION OF THE DRAWINGS

The above and other features and advantages of the present invention will become more apparent by describing in detail exemplary embodiments thereof with reference to the attached drawings in which:

FIG. 8 is a diagram illustrating another example of the format of the triggered reporting subfield when the triggered radio measurement request frame shown in FIG. 5 is associated with a QoS STA counter.

FIG. 11 is a diagram illustrating an example of a format of a RSNA counter triggering condition field shown in FIG. 10.

FIG. 15 is a diagram illustrating another example of the format of the reporting reason unit shown in FIG. 12.

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In embodiments and the drawings, respective elements are denoted by designation numerals for convenience.

Hereinafter, a management procedure in a wireless communication system and a station supporting the management procedure according to exemplary embodiments of the invention will be described in detail with reference to the accompanying drawings. In the following embodiments, a wireless LAN (WLAN) system is described as a wireless communication system, but this is only exemplary. Accordingly, the embodiments to be described below can be applied to wireless communication systems other than the WLAN system, as long as they can be permitted in nature. In this case, terms or words specific to the WLAN system used in the embodiments can be properly modified into terms or words customarily used in the corresponding wireless communication system.

Figure 1:
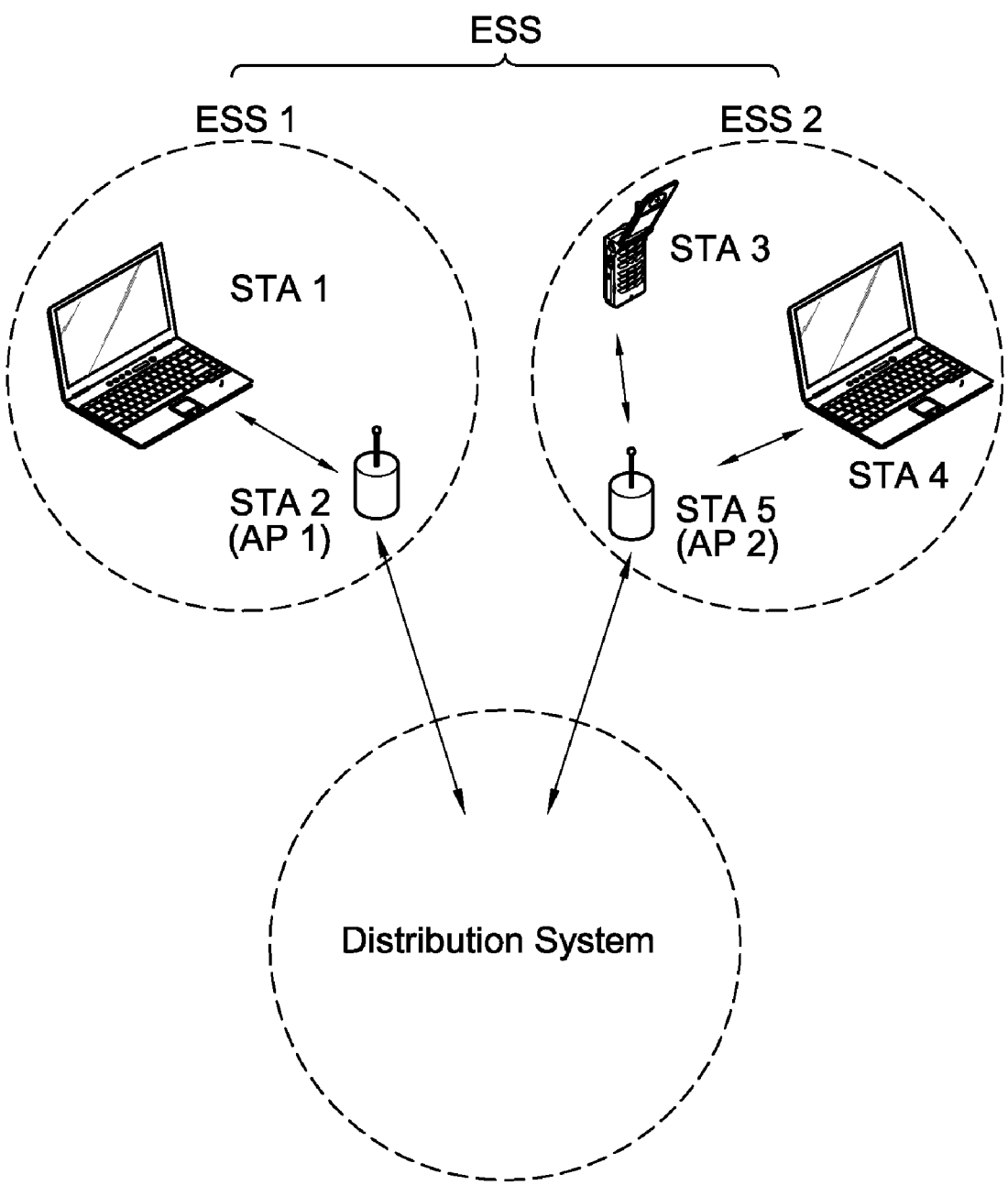
FIG. 1 is a block diagram illustrating a configuration of an infrastructure basic service set as an example of a wireless LAN system.
Figure 2:
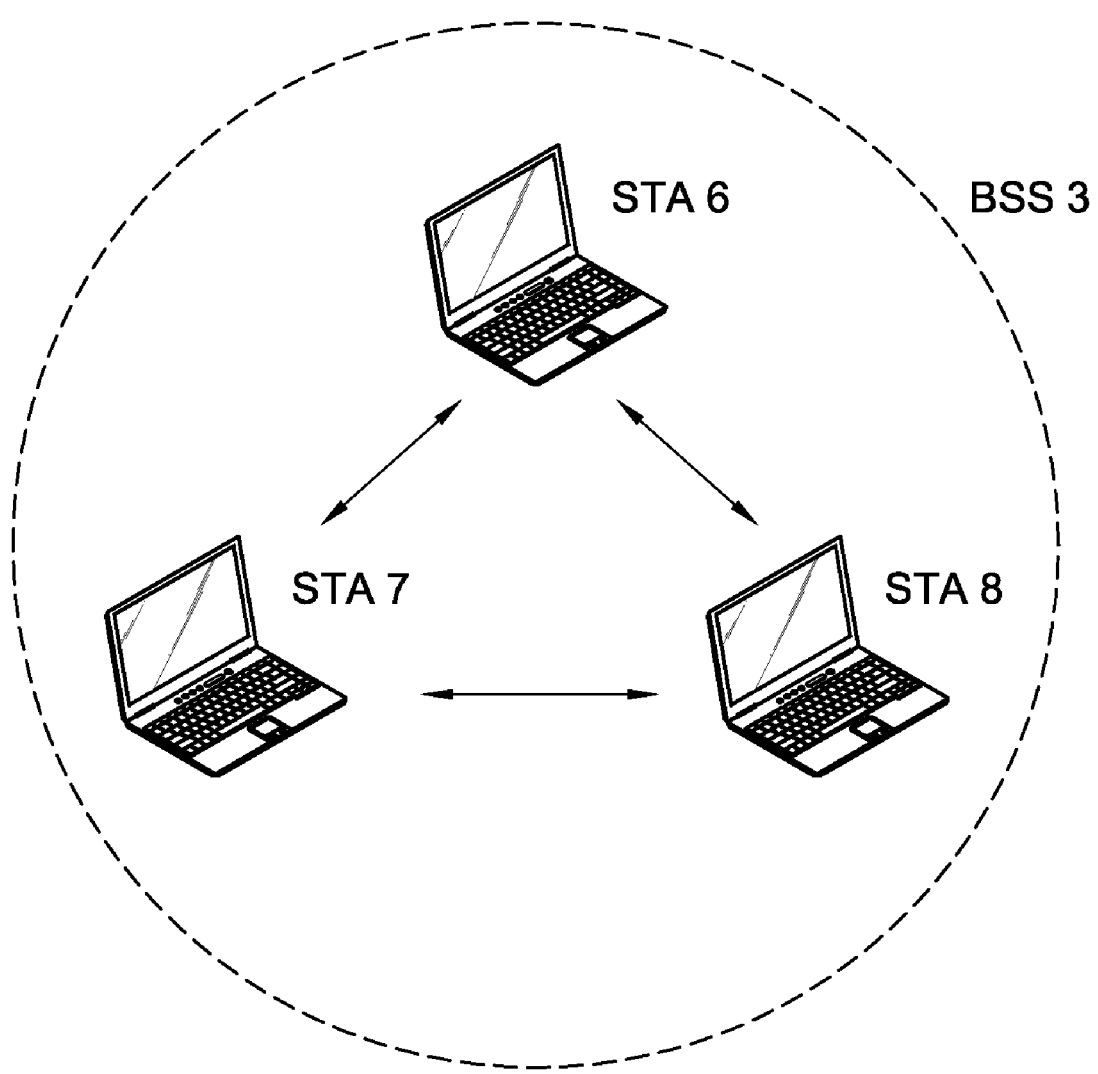
FIG. 2 is a block diagram illustrating a configuration of an independent basic service set as an example of a wireless LAN system.

FIGS. 1 and 2 schematically show configurations of examples of a WLAN system to which the embodiments of the invention can be applied.

As shown in FIGS. 1 and 2, a WLAN system includes one or more basic service sets (BSS). The BSS is a set of stations (STAs) which can be successfully synchronized and communicate with each other, but is not a concept indicating a specific area. The BSS can be classified into an infrastructure BSS and an independent BSS (IBSS). The former is shown in FIG. 1 and the latter is shown in FIG. 2. The infrastructure BSSs BSS1 and BSS2 include one or more STAs STA1, STA2, STA3, and STA4, an access point (AP) which is a STA providing a distribution service, and a distribution system (DS) connecting plural APs AP1 and AP2. On the contrary, the IBSS does not include an AP and all the STAs are mobile stations STA6, STA7, and STA8. In the IBSS, an access to the DS is not permitted, thereby constituting a self-contained network.

A STA is a functional unit including a medium access control (MAC) interface and a physical layer interface for a wireless medium in accordance with the IEEE 802.11 standard and includes both APs and non-AP stations in a wide meaning. A station for wireless communication includes a processor and a transceiver and further includes a user interface and a display unit. The processor is a functional unit designed to generate a frame to be transmitted through a wireless network or to process a frame received through the wireless network and serves to perform a variety of functions of controlling the station. The transceiver is operably connected to the processor and is a unit designed to transmit and receive frames through a wireless network.

A portable terminal operated by a user is a non-AP STA (STA1, STA3, STA4, STA6, STA7, and STA8). Simply, a STA may mean a non-AP STA. The non-AP STA may be called a wireless transmitting/receiving unit (WTRU), a user equipment (UE), a mobile station (MS), a portable terminal, or a mobile subscriber unit.

The AP (AP1 and AP2) is a functional entity providing connection to the DS through a wireless medium for the associated stations. A communication between the non-AP STAs in the infrastructure BSS including an AP is made through the AP in principle, but the non-AP STAs may communicate directly with each other when a direct link is set up therebetween. The AP may be called a convergence controller, a base station (BS), a node-B, a base transceiver system (BTS), or a site controller, in addition to the tile of an access point.

Plural infrastructure BSSs can be connected to each other through the DS. The plural BSSs connected through the DS are called an extended service set (ESS). The STAs in the ESS can communicate with each other and the non-AP STAs can move from one BSS to another BSS while communicating without any interception.

The DS is a mechanism for allowing an AP to communicate with another AP. Accordingly, the AP can transmit a frame for the STAs associated with the BSS managed by the AP, forward a frame when a STA moves to another BSS, or forward a frame to an external network such as a wired network. The DS may not be a network necessarily, and is not limited in type as long as it can provide a predetermined distribution service defined in the IEEE 802.11 standard. For example, the DS may be a wireless network such as a mesh network or a physical structure for connecting the APs to each other.

Figure 3:
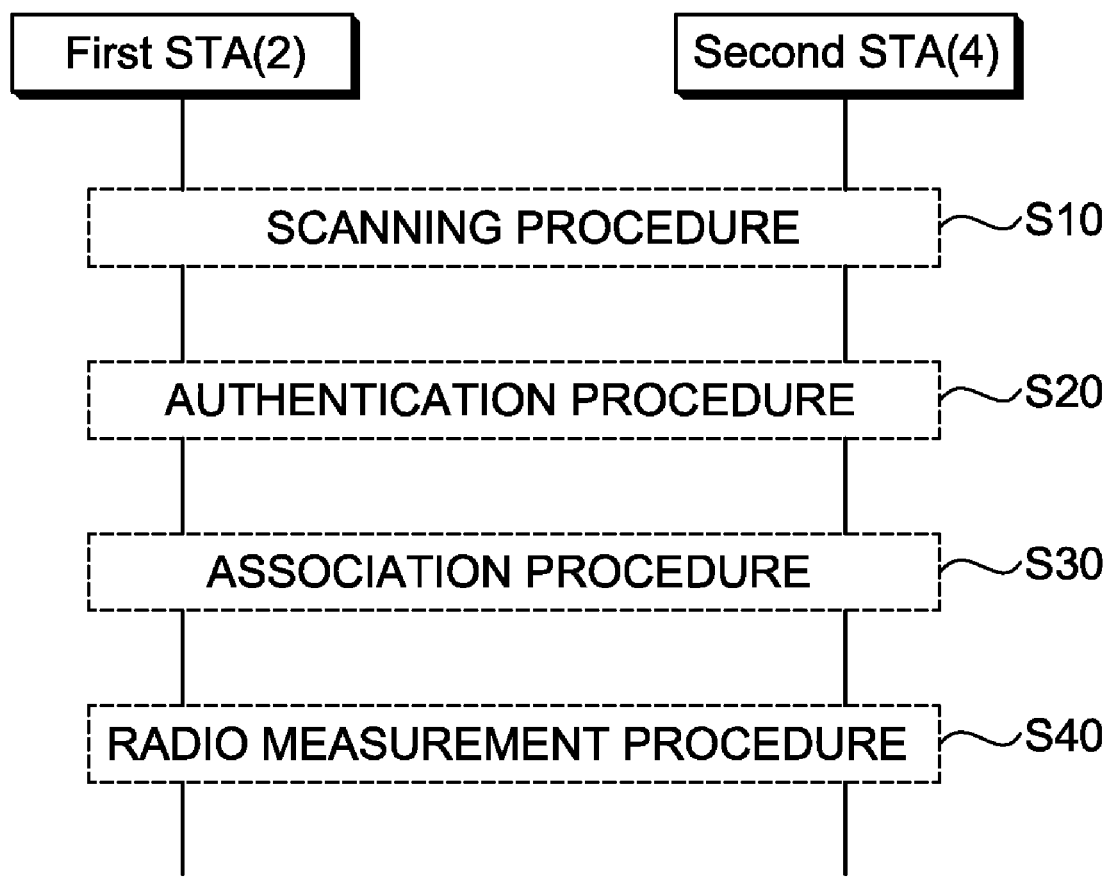
FIG. 3 is a flowchart illustrating a management procedure of a wireless network in a wireless communication system according to an embodiment of the invention.

FIG. 3 is a flowchart illustrating a management procedure of a wireless network in a wireless LAN system shown in FIG. 1 or 2 or in a wireless communication system including the wireless LAN system or equivalent thereto according to an embodiment of the invention. The flowchart of operations between the first STA 2 and the second STA 4 shown in FIG. 3 can show a procedure performed between a non-AP STA and an AP constituting an infrastructure BSS, but it is obvious to those skilled in the art that the embodiment is not limited to the procedure. For example, the embodiment can be equally or similarly applied to operations between non-AP STAs in an IBSS, operations between mesh points (MP) in a mesh network system, or operation between terminals of different wireless communication systems or between a terminal and a base station, as long as it can be applied thereto in nature.

Referring to FIG. 3, a radio measurement procedure in a wireless communication system according to the embodiment of the invention further includes as preliminary procedures a scanning procedure (S10), an authentication procedure (S20), and/or an association procedure (S30) and further includes a radio measurement procedure (S40) which is performed after the preliminary procedures S10 to S30. According to the embodiment of the invention, some procedures of the preliminary procedures may not be essential but arbitrary.

Referring to FIG. 3, the scanning procedure S10 is first performed between the first STA 2 and the second STA 4. The scanning procedure S10 is a procedure for allowing the first STA 2 to search for a candidate station to be associated in the association procedure S30, for example, a procedure for allowing a non-AP STA to search for an AP in the infrastructure BSS. However, the scanning procedure in a wider meaning may include a procedure for allowing a non-AP STA to search for a neighboring non-AP STA in the IBSS or a procedure for allowing a non-AP STA to search for a neighboring MP in a mesh network.

The scanning procedure can be classified into two types. One is a passive scanning method using a beacon frame transmitted from the second STA 4 and the like. In this method, the first STA 2 to access a wireless LAN can search for an accessible BSS by receiving a beacon frame periodically transmitted from the second STA 4 which is an AP managing the corresponding BSS (or IBSS). The passive scanning method can be applied when the second STA 4 is an AP transmitting a beacon frame.

The other is an active scanning method. In this method, the first STA 2 to access a wireless LAN system, for example, an AP, first transmits a probe request frame. The second STA 4 having received the probe request frame transmits a probe response frame including a service set ID (SSID) of the BSS managed by the AP and information on capability supported by the AP. Accordingly, the first STA 2 can know existence of a candidate AP and a variety of information on the candidate AP from the received probe response frame.

In the scanning procedure S10, when the second STA 4 transmitting the beacon frame or the probe response frame is a device supporting a location service, the beacon frame or the probe response frame may include location parameter information elements. The location parameter information can include one or more of various information pieces required for allowing the first STA 2 having received the beacon frame, etc. to perform the location procedure, such as location indication parameters, location indication channels, location request options, location service parameters, and radio information pieces.

Referring to FIG. 3, the authentication procedure S20 is performed between the first STA 2 and the second STA 4. The authentication procedure S20 is a procedure for negotiating an authentication process and an encoding method between entities participating in a wireless communication. For example, the first STA 2 can perform the authentication procedure S20 with the second STA 4 to be associated of one or more APs searched for in the scanning procedure S10, for example, an AP. In the WLAN, since an open system authentication method is used in most cases, the second STA 4 as an AP performs the authentication process without any condition in response to the authentication request from the first STA 2. Reinforced authentication methods include EAP-TLS (Extensible Authentication Protocol-Transport Layer Security), EAP-TTLS (Extensible Authentication Protocol-Tunneled Transport Layer Security), EAP-FAST (Extensible Authentication Protocol-Flexible Authentication via Secure Tunneling), and PEAP (Protected Extensible Authentication Protocol) based on the IEEE 802.1x standard.

When the authentication process is successfully completed in the authentication procedure S20, the first STA 2 performs the association procedure S30. The association procedure S30 may be an arbitrary procedure which is performed when the first STA 2 is a non-AP STA and the second STA 4 is an AP. The association procedure S30 is to set up an identifiable link, that is, a wireless link, between the first STA 2 and the second STA 4. In the association procedure S30, the first STA 2 transmits an association request frame to the second STA 4 having successfully completed the authentication procedure S20 and the second STA 4 transmits to the first STA 2 an association response frame having a state value of "successful" in response to the association request frame. The association response frame includes an identifier for identifying the association with the first STA 2, for example, an association ID (AID).

When the association procedure S30 has been successfully completed but the connection state between the first STA 2 and the second STA 4 is deteriorated due to a variable channel condition, the first STA 2 can perform the association procedure with another accessible AP again, which is called a re-association procedure. The re-association procedure is very similar to the above-mentioned association procedure S30. More specifically, in the re-association procedure, the first STA 2 transmits a re-association request frame to a different AP (an AP having successfully completed the authentication procedure S20 among the candidate APs searched for in the scanning procedure S10) other than the AP currently associated therewith, and the different AP transmits a re-association response frame to the first STA 2. However, the re-association request frame further includes information on the AP previously associated therewith and the re-associated AP can transmit data buffered in the second STA 4, which is an existing AP, using the information.

According to the embodiment, in the association procedure S30 or the re-association procedure, the association request frame or the re-association frame transmitted from the first STA 2 to the second STA 4 may include a location capability value of the first STA 2. Accordingly, the first STA 2 supporting the location capability can transmit the association request frame or the re-association request frame in which a location descriptor sub-element is included in a location parameter information element.

Referring to FIG. 3, the radio measurement procedure is performed between the first STA 2 and the second STA 4 having completed the authentication procedure S20 or the association procedure S30 in addition thereto (S40). Although it has been shown in FIG. 3 that the radio measurement procedure is performed between the first STA 2 and the second STA 4 having completed the association procedure S30 in the infrastructure BSS, the radio measurement procedure S40 described later according to an embodiment of the invention is not limited to the figure. For example, the radio measurement procedure according to an embodiment of the invention may be performed between the non-AP STA and the AP shown in FIG. 3, between two peer non-AP STAs setting up a direct link, ore between two peer MPs setting up a mesh link. However, when the radio measurement procedure is performed between the non-AP STAs, the radio measurement procedure can be performed between the non-AP STAs setting up a direct link.

A protocol applicable to the radio measurement procedure according to the embodiment of the invention will be described in detail. The protocol for the radio measurement procedure can be applied to the radio resource measurement procedure of step S40 shown in FIG. 3 or the radio measurement procedure for the triggered STA statistic request described with reference to FIG. 4 as an example of step S40.

In the wireless network system, a STA can perform a radio measurement procedure on one or more channels or request one or more different STAs belonging to the same BSS or IBSS for performing the radio measurement procedure instead. When it requests another STA for measuring one or more channel, the requesting STA transmits to the requested STA a radio measurement request frame containing one or more measurement request elements. The radio measurement request frame can be transmitted to the requested STA having an individual address or a group destination address.

In the radio resource measurement procedure, the requesting STA and the requested STA are members of the same infrastructure BSS or IBSS. The radio measurement request frame having an individual reception address is transmitted to only the STA setting its radio measurement capability in the previous procedures (such as the association procedure S30 in FIG. 3). The measurement request elements included in one radio measurement request frame can specify plural measurement types over plural channels.

The STA having transmitted a radio measurement request for measuring an operating channel to a different STA can transmit the MPDU and the MMPDU to the different STA even in the course of performing the requested measurement. The STA having transmitted a radio measurement request for measuring a non-operating channel to a different STA need not perform any particular action so as to transmit traffics to the different STA.

The measurement results requested by the radio measurement request elements are included in one or more measurement report elements corresponding to the request and are reported to the requesting STA. Each measurement report element transmitted in response has the same measurement token as included in the corresponding measurement request element. The measurement results should be transmitted to the requesting STA without any improper delay. The measurement report elements are included in one or more radio measurement report frame and are transmitted to the requesting STA. Each radio measurement report frame has the same dialog token as included in the corresponding radio measurement request frame.

In the radio measurement procedure in the wireless communication system according to the embodiment of the invention, when the radio measurement type to be requested is a STA statistic request, a QoS STA statistic request, or an RSNA statistic request, a triggered STA statistic request for specifying a triggering condition and a threshold value for the statistic measurement of the triggered STA can be made. That is, according to the embodiment of the invention, by permitting the triggered STA statistic request for the STA statistic request, the QoS STA statistic request, or the TSNA statistic request, it is possible to reduce the load on the wireless communication system due to the acquisition of the radio measurement information. According to the embodiment of the invention, this is because it is possible to reduce the load on the requesting STA transmitting the radio measurement request frame every time and to reduce an unnecessary signaling in the wireless network system to enhance the use efficiency of the radio resources, by permitting the triggered statistic request for the QoS STA statistic request and the RSNA statistic request as well as the STA statistic request.

In this case, the requesting STA can instruct to want to receive a triggered autonomous report by transmitting to a requested STA predetermined information such as a radio measurement request frame including a measurement request element of which an enable bit and a report bit are set to "1". The measurement type to be included in the triggered autonomous report is instructed by the measurement type field of the measurement request element. The triggering condition used to control the triggered autonomous report is included in the radio measurement request frame and is transmitted. The measurement request elements used for the measurement request may be included in the same radio measurement request frame. The radio measurement request frame may be transmitted to a group destination address so as to permit the autonomous report triggered by one or more STAs. The requested STA does not transmit the autonomous report, when the requested triggering condition is not satisfied.

The requested STA having received the radio measurement request frame for requesting the autonomous report triggered by another STA transmits a proper type of report to the individual address of the requesting STA. That is, in the triggered STA statistic procedure, the requested STA transmits the autonomous report frame to only the individual address of the proper requesting STA when the specified condition is satisfied.

The non-AP STA as the requested STA having received the triggered STA statistic request including various measurement types can perform plural triggered measurement procedures of the plural measurement types. In this case, the triggered measurement procedures are logically independent of each other. The reporting conditions such as a triggered timeout time are applied to only the measurement request to which it is set.

The radio measurement procedure associated with the triggered STA statistics in the wireless network system according to the embodiment of the invention will be described.

Figure 4:
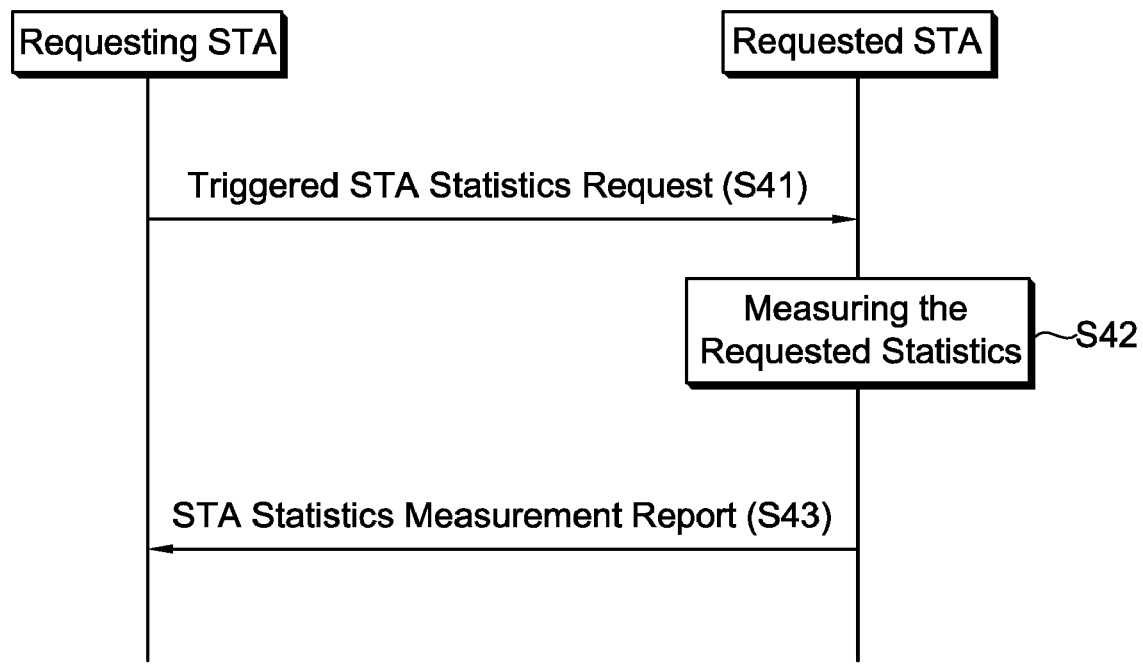
FIG. 4 is a message flowchart illustrating a radio measurement procedure for triggered STA statistics according to an embodiment of the invention.

FIG. 4 is a message flowchart illustrating the radio measurement procedure associated with the triggered STA statistics according to an embodiment of the invention. The radio measurement procedure according to the embodiment of the invention is a procedure associated with the triggered STA statistics for allowing a requesting STA to specify the condition of reporting the STA statistics collected by the reporting STA or the requested STA for a predetermined time. Here, the "requesting STA" means an STA transmitting the STA statistic request frame for acquiring the STA statistic information from another STA. The "reporting STA", the "measuring STA", or the "requested STA" means an STA transmitting the STA statistic report frame including the STA statistic information collected in response to the STA statistic request frame to the requesting STA.

Referring to FIG. 4, the requesting STA (for example, the first STA 2 in FIG. 3) transmits a message for requesting for the conditional STA statistic report such as a triggered STA statistic request message to the reporting STA or the requested STA (for example, the second STA 4 in FIG. 3) (S41). The "conditional STA statistic report" means a STA statistic report to be transmitted when an interested specific statistics associated with the radio measurement is a defined threshold value. The triggered STA statistic request message has a format in which information for specifying a predetermined triggering condition for allowing a STA having received the message to transmit a report frame in response to the measurement request is added to the usual STA statistic request message.

The triggered STA statistic request message for requesting another STA for the STA statistic report may be a frame including STA statistic request elements as the measurement request elements. In this case, the STA statistic request message may be a triggered radio measurement request frame.

According to the embodiment of the invention, the triggered radio measurement request frame is different from a usual radio measurement request frame including the STA statistic request elements not having a triggered reporting subfield, in that the triggered reporting subfield is further included in the STA statistic request elements as the measurement request elements included in the triggered radio measurement request frame. According to the embodiment of the invention, a statistic group of the triggering condition specified in the triggered reporting subfield may be associated with an STA counter, a QoS STA counter, and an RSNA counter. Accordingly, in the following description, the triggered radio measurement request frame may be called a triggered STA statistic frame, a triggered QoS STA statistic request frame, or a triggered RSNA statistic request frame, which is exemplary.

Figure 5:
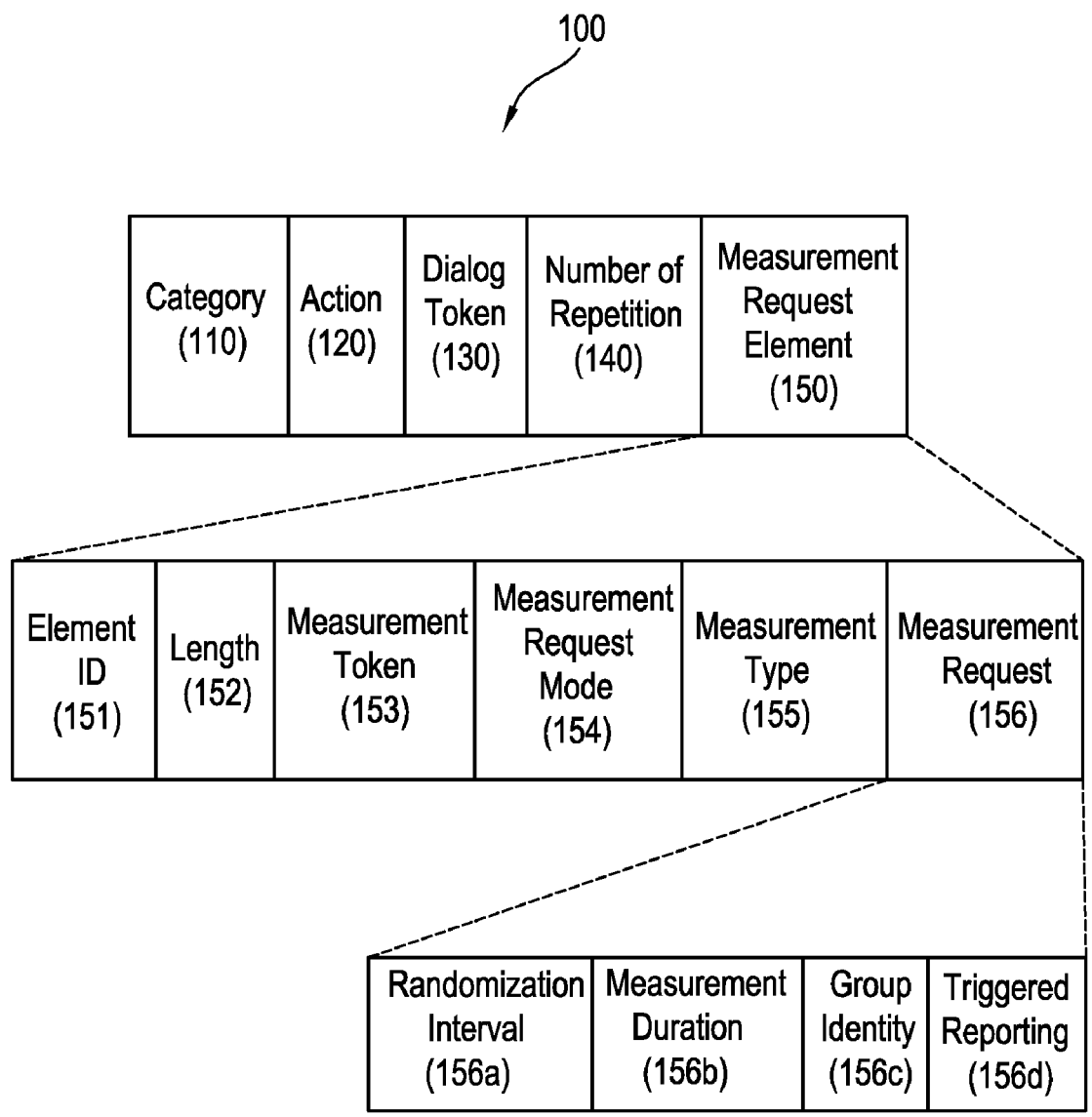
FIG. 5 is a diagram illustrating an example of a format of a triggered radio measurement request frame according to an embodiment of the invention.

FIG. 5 is a diagram illustrating an example of a format of the triggered radio measurement request frame 100 according to the embodiment of the invention. Referring to FIG. 5, the triggered radio measurement request frame 100 includes a category field 110, an action field 120, a dialog token field 130, a number-of-repetitions field 140, and a measurement request element field 150. Since the measurement type of the triggered radio measurement request frame 100 is the STA statistic request, the measurement request element field 150 includes the STA statistic request elements. The measurement request field 156 of the STA statistic request elements additionally includes a triggered reporting subfield 156d. Now, the elements of the triggered radio measurement request frame 100 will be described in detail.

The category field 110 can be set to a value indicating a radio measurement category. The action field 120 can be set to a value indicating the measurement request of radio measurement actions. The dialog token field 130 can be set to a value other than 0 and selected by the requesting STA, where the value may be a specific value for identifying the exchange of the triggered radio measurement request frame 100 and the radio measurement report frame transmitted in response thereto.

The number-of-repetitions field 140 is set to a value indicating the number of repetitions to be requested to all the measurement request elements included in the measurement request element field 150 of the triggered radio measurement request frame 100. When the value is "0", it indicates that the corresponding measurement request element is performed only once without repetition. On the contrary, when the value of the number-of-repetitions field 140 is the largest value (for example, 65535 when the size of the number-of-repetitions field 140 is 2 bytes) which can be included in the number-of-repetitions field 140, it indicates that the corresponding measurement element is performed repeatedly until the measurement request is cancelled or replaced.

The measurement request element field 150 may not include any or may include plural measurement request elements. The measurement request element field 150 includes request details for the statistical elements which the requesting STA wants to acquire from the requested STA or request details for a specified measurement action which the requested STA enters into. The number and length of measurement request elements which can be included in the triggered radio measurement request frame 100 can be limited by the allowable size of the MMPDU (MAC Management Protocol Data Unit). The measurement request element field 150 includes an element ID subfield 151, a length subfield 152, a measurement token subfield 153, a measurement request mode subfield 154, a measurement type subfield 155, and a measurement request subfield 156.

The element ID subfield 151 is set to a value indicating the measurement request information elements from various information elements. The value set in the length subfield 152 is variable and depends on the length of the measurement request subfield 156. The measurement token subfield 153 is set to a value other than 0 as a value a specific value of the measurement request elements transmitted along with the triggered radio measurement request frame 100. That is, the measurement token subfield 153 is used to identify the exchange of the measurement request elements included in the triggered radio measurement request frame 100 and the measurement report elements included in the radio measurement report frame in response to the measurement request elements.

The measurement request mode subfield 154 is used to indicate how to process the request for activating or deactivating the measurement request and the autonomous report and includes information indicating whether one or more measurement procedures should be started in parallel and whether the measurement is requested or the measurement request is controlled, and information indicating the type of the measurement request such as the report type in response to the measurement request. The indication of the triggered radio measurement request frame can be performed by setting the measurement request mode subfield 154 to a predetermined value.

The measurement type subfield 155 is generally set to a value indicating the type of the measurement request or the type of the measurement report. In the triggered radio measurement request frame 100 for the STA statistics, that is, when the measurement type is the STA statistic request, the measurement type subfield 155 is set to a value indicating the STA statistic request as the measurement request type.

The measurement request subfield 156 includes detailed information on the measurement type specified in the measurement type subfield 155. In the triggered radio measurement request frame 100 for the STA statistics, the measurement request subfield 156 can include a randomization interval subfield 156a, a measurement duration subfield 156b, a group identifier subfield 156c, and a triggered reporting subfield 156d.

The randomization interval subfield 156a includes a value arbitrarily specified in response to the request STA, where the value is used to specify the upper limit of the measurement start time of the measurement request when the measurement is continuously requested. The measurement duration subfield 156b is generally set to a value indicating a time interval for performing the measurement in response to the corresponding request. As in the embodiment of the invention, when the triggered radio measurement request for the STA statistics is made, the measurement duration subfield 156b can be set to "0". The group identifier subfield 156c is set to a value indicating one requested statistical group and examples of the value indicating the statistical group is shown in Table 1.

TABLE 1

| Statistics Group Name | Group Identity |
|---|---|
| STA Counters from dot11CountersTable | 0 |
| STA Counters from dot11MacStatistics group | 1 |
| QoS STA Counters for UP0 from dot11QosCountersTable | 2 |

TABLE 1-continued

| Statistics Group Name | Group Identity |
|---|---|
| QoS STA Counters for UP1 from dot11QosCountersTable | 3 |
| QoS STA Counters for UP2 from dot11QosCountersTable | 4 |
| QoS STA Counters for UP3 from dot11QosCountersTable | 5 |
| QoS STA Counters for UP4 from dot11QosCountersTable | 6 |
| QoS STA Counters for UP5 from dot11QosCountersTable | 7 |
| QoS STA Counters for UP6 from dot11QosCountersTable | 8 |
| QoS STA Counters for UP7 from dot11QosCountersTable | 9 |
| BSS Average Access Delays | 10 |
| RSNA Counters | 11 |

As can be seen from Table 1, the "STA counters from a counter table (STA counters from dot11CountersTable)" and the "STA counters from MAC statistic groups (STA counters from dot11MacStatistics group)" are common in that they are not associated with the QoS and they are associated with the STA counters, but are distinguished from each other in the group identifiers. That is, since the "STA counters from a counter table (STA counters from dot11CountersTable)" and the "STA counters from MAC statistic groups (STA counters from dot11MacStatistics group)" are different in statistic groups, different group identifiers are used.

The group identifiers of the "STA counters from dot11QosCountersTable" (hereinafter, referred to as "QoS STA counters") are subdivided by the QoS level (see Group Identifiers 2 to 9). The group identifiers of the QoS STA counters are subdivided and distinguished from each other by the QoS level and are different from the group identifiers of the STA counters not associated with the group identifiers of the QoS (of which the group identifiers are "0" or "1") or the RSNA counters (of which the group identifiers are "16"). The RSNA counters have group identifiers independent of the STA counters and the QoS STA counters.

Referring to FIG. 1, the triggered reporting subfield 156d is used to specify the condition for triggering a report from the requested STA, the value of the triggered timeout, and the threshold values of the measurement items of the measurement groups of the STA statistic request. In general, the triggered reporting subfield 156d is arbitrarily included in the measurement request field 156. However, as in the embodiment of the invention, in case of the triggered radio measurement request frame specifying the condition for reporting the STA counters (hereinafter, "STA counters" means general STA counters not associated with the QoS), the QoS STA counters, and the RSNA counters, the triggered reporting subfield 156d is necessarily included in the measurement request subfield 156. However, the information included in the triggered reporting subfield 156d is different depending on with what STA counter the triggered radio measurement request frame is associated, which is described below.

Triggered Radio Measurement Request Frame Associated with the STA Counters

Figure 6:
FIG. 6 is a diagram illustrating an example of a format of a triggered reporting subfield when the triggered radio measurement request frame shown in FIG. 5 is associated with an STA counter.

FIG. 6 is a diagram illustrating an example of a format of the triggered reporting subfield 156d when the triggered radio measurement request frame 100 is associated with the STA counters. In the triggered reporting subfield 156d having the format shown in FIG. 6, the group identifier subfield 156c of the triggered radio measurement request frame 100 shown in FIG. 5 is set to the values (the value of the group identifiers are 0 or 1 in Table 1) associated with the STA counters.

Referring to FIG. 6, the reporting condition subfield 156 includes the STA counter triggering condition subfield 210, a measurement counter subfield 218, and a trigger timeout subfield 219 and can include one or more subfields of a failure threshold subfield 211, a retry threshold subfield 212, multiple retry threshold subfield 213, a frame duplicate threshold subfield 214, an RTS failure threshold subfield 215, an ACK failure threshold subfield 216, and an FCS error threshold subfield 217.

Among the subfields 211 to 217 for specifying threshold values of the items of the STA counters, the failure threshold subfield 211 and the FCS error threshold subfield 217 are associated with the group identifiers (for example, the group identifiers of "0" in Table 1) of the STA counters (hereinafter, referred to as "first STA counters") from the counter table. On the contrary, the other subfields such as the retry threshold subfield 212, the multiple retry threshold subfield 213, the frame duplicate threshold subfield 214, the RTS failure threshold subfield 215, and the ACK failure threshold subfield 216 are associated with the group identifiers (for example, the group identifiers of "1" in Table 1) of the STA counters (hereinafter, referred to as "second STA counters") from the MAC statistic group.

The STA counter triggering condition subfield 210 is used to specify the condition for triggering the reporting when the triggered radio measurement reporting for the STA statistics is requested. In the STA counter triggering condition subfield 210, one or more triggering conditions are set along with a specific threshold. The STA counter triggering condition subfield 210 can include plural bit-fields and an example of the format thereof is shown in FIG. 7.

Figure 7:
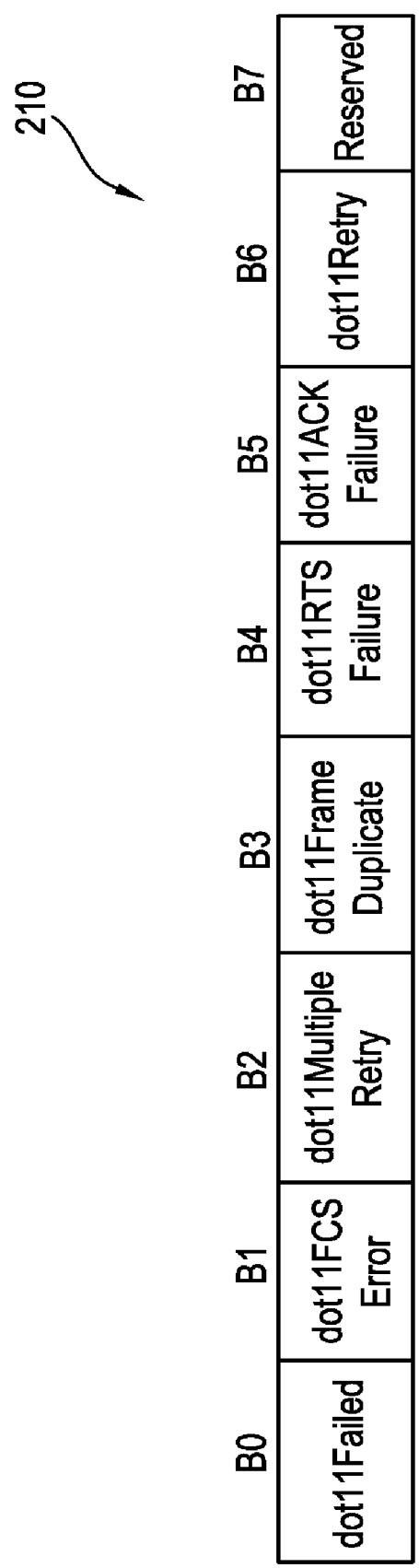
FIG. 7 is a diagram illustrating an example of a format of a STA counter triggering condition subfield shown in FIG. 6.

Referring to FIG. 7, the STA counter triggering condition subfield 210 includes a failure bit B0 and an FCS error bit B1 as bits associated with the group identifiers (for example, the group identifiers of "0" in Table 1) of the first STA counters and includes a multiple retry bit B2, a frame duplicate bit B3, an RTS failure bit B4, an ACK failure bit B5, and/or a retry bit B6 as the bits associated with the group identifiers (for example, the group identifiers of "1" in Table 1) of the second STA counters. The bits can be set to "0" or "1". For example, when a bit is set to "0", it indicates that it is not necessary to report the corresponding triggering condition. On the contrary, when a bit is set to "1", it indicates that the reporting of the corresponding triggering condition is requested.

Accordingly, when the bits of the STA counter triggering condition field 210 are set to "1", it means that the generation of the STA statistic report frame is requested when the value of the corresponding STA counter is greater than the threshold values defined in the corresponding subfields 211 to 217. The value of the corresponding STA counter is measured in the range of the total number of MSDUs in the measurement count subfield 218.

The requesting STA hoping to receive the triggered report of the STA counters can set one or more bits (one or more of B0 to B6) corresponding to the condition to "1" in the STA counter triggering condition subfield 210 shown in FIG. 7 and can specify a predetermined threshold in the threshold subfield of the STA counter item corresponding to the bit set to "1" in the STA counter triggering condition subfield 210, in the threshold subfields 211 to 217 of the STA counter items of the triggered reporting subfield 156d shown in FIG. 6.

The group identifier subfield 156c in FIG. 5 is set to any one of the group identifier values shown in Table 1. On the contrary, the reporting condition subfield 156d shown in FIG. 6 and the STA counter triggering condition subfield 210 shown in FIG. 7 together include the triggering conditions associated with two types of statistic groups, that is, the group of the first STA counters (for example, the group identifiers of "1" in Table 1) and the group of the second STA counters (for example, the group identifiers of "1" in Table 1). In order to systematically and efficiently the reporting conditions, the value of the STA counter triggering condition subfield 210 shown in FIG. 7 should be set to correspond to the value set in the group identifier subfield 156c.

For example, when the group identifier subfield 156c is set to "0" as shown in Table 1, it is preferable that the triggering conditions corresponding to the group of the second STA counters of which the group identifiers are "1" cannot be set. Accordingly, when the group identifier subfield 156c is set to "0", the thresholds of the items of the STA counters of which the group identifiers are "1" is not set by setting to "0" the bits B2 to B6 in the STA counter triggering condition subfield 210 shown in FIG. 7. On the contrary, when the group identifier subfield 156c is set to "1" as shown in Table 1, the triggering conditions of the first STA counter group of which the group identifiers is "0" should not be set. Accordingly, when the group identifier subfield 156c is set to "1", the thresholds of the items of the STA counters of which the group identifiers is "0" is not set by setting to "0" the bits B0 and B1 in the STA counter triggering condition subfield 210 shown in FIG. 7.

According to this embodiment, by restricting the values of the bit-fields of the items of the STA counters associated with the non-corresponding group identifiers in the STA counter triggering condition subfield on the basis of the values indicated by the group identifiers, it is possible to efficiently construct the STA statistic request frame for the STA counters. In addition, according to this embodiment, by efficiently constructing the STA statistic request frame, it is possible to efficiently and systematically exchange the triggered STA statistic request frame and the STA statistic report frame in the triggered radio measurement procedure.

Referring to FIG. 6, information indicating the number of MSDUs (MAC Service Data Unit) used to determine whether the measured statistics are greater than the set thresholds is included in the measurement counter field 218. Information indicating the time when the measuring STA does not generate an additional STA counter statistic report after the triggering condition is satisfied is included in the trigger timeout field 219.

The failure threshold subfield 211 includes a value indicating the number of MSDUs used as the threshold of the failure condition. The failure threshold subfield 211 is valid only when the failure bit (dot11Failed) of the STA counter triggering condition subfield 210 is set to "1".

The retry threshold subfield 212 includes a value indicating the number of MSDUs used as the threshold of the retry condition. The retry threshold subfield 212 is valid only when the retry bit (dot11Retry) of the STA counter triggering condition subfield 210 is set to "1".

The multiple retry threshold subfield 213 includes a value indicating the number of MSDUs used as the threshold of the multiple retry condition. The multiple retry threshold subfield 213 is valid only when the multiple retry bit (dot11MultipleRetry) of the STA counter triggering condition subfield 210 is set to "1".

The frame duplicate threshold subfield 214 includes a value indicating the number of MSDUs used as the threshold of the frame duplicate condition. The frame duplicate threshold subfield 214 is valid only when the frame duplicate bit (dot11FrameDuplicate) of the STA counter triggering condition subfield 210 is set to "1".

The RTS failure threshold subfield 215 includes a value indicating the number of MSDUs used as the threshold of the RTS failure condition. The RTS failure threshold subfield 215 is valid only when the RTS failure bit (dot11RTSFailure) of the STA counter triggering condition subfield 210 is set to "1".

The ACK failure threshold subfield 216 includes a value indicating the number of MSDUs used as the threshold of the ACK failure condition. The ACK failure threshold subfield 216 is valid only when the ACK failure bit (dot11ACKFailure) of the STA counter triggering condition subfield 210 is set to "1".

The FCS error threshold subfield 217 includes a value indicating the number of MSDUs used as the threshold of the FCS error condition. The FCS error threshold subfield 217 is valid only when the FCS error bit (dot11FCSError) of the STA counter triggering condition subfield 210 is set to "1".

Triggered STA Statistic Request Procedure for QoS STA Counters

Another example of a format of the triggered reporting subfield 156*d* shown in FIG. 5 is shown in FIG. 8. In the triggered reporting subfield 156*d* having the format shown in FIG. 8, the group identifier unit 156*c* shown in FIG. 5 is set to a value (one value of the group identifier values 2 to 9 shown in Table 1) corresponding to a QoS STA counter.

Referring to FIG. 8, the triggered reporting subfield 156*d* includes a QoS STA counter triggering condition subfield 310 (QoS STA Counter Trigger Condition), a QoS failure threshold subfield 311 (dot11QoSFailed Threshold), a QoS retry threshold subfield 312 (dot11QoSRetry Threshold), a QoS multiple retry threshold subfield 313 (dot11QoSMultiple Retry Threshold), a QoS frame duplicate threshold subfield 314 (dot11QoSFrame Duplicate Threshold), a QoS RTS failure threshold subfield 315 (dot11QoSRTS Failure Threshold), a QoS ACK failure threshold subfield 316 (dot11QoSACK Failure Threshold), a QoS discard threshold subfield 317 (dot11QoSDiscarded Threshold), a measurement count subfield 318, and a trigger timeout subfield 319. Here, the threshold subfields 311 to 317 are arbitrary fields that are valid only when the corresponding bit in the QoS STA counter triggering condition subfield 310 is set to "1".

Figure 9:
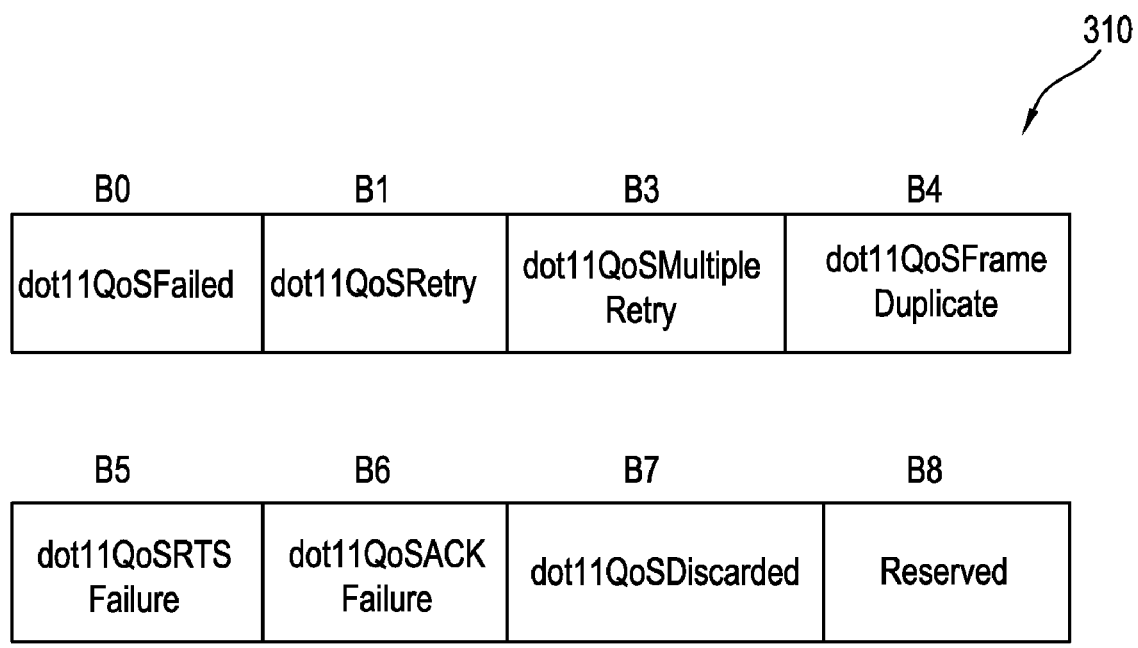
FIG. 9 is a diagram illustrating an example of a format of a QoS STA counter triggering condition field shown in FIG. 8.

The QoS STA counter triggering condition subfield 310 is used to specify a condition triggering the reporting when requesting for a triggered QoS STA statistic report. In the QoS STA counter triggering condition subfield 310, one or more triggering conditions are set along with a specific threshold. The QoS STA counter triggering condition subfield 310 can include plural bit-fields, a format of which is shown in FIG. 9. Referring to FIG. 9, the QoS STA counter triggering condition subfield 310 includes a QoS failure bit-field B0 (dot11QoSFailed), a QoS retry bit-field B1 (dot11QoSRetry), a QoS multiple retry bit-field B2 (dot11QoSMultiple Retry), a QoS frame duplicate bit-field B3 (dot11QoSFrame Duplicate), a QoS RTS failure bit-field B4 (dot11QoSRTS Failure), a QoS ACK failure bit-field B5 (dot11QoSACK Failure), and a QoS discard bit-field B6 (dot11QoSDiscarded). The bits can be set to "0" or "1". When the bit is set to "0", it indicates that it is not necessary to report the corresponding triggering condition. On the contrary, when one or more bits are set to "1", it indicates that it is requested to report the corresponding triggering condition.

Accordingly, if the bits of the QoS STA counter triggering condition subfield 310 are set to "1", it means that it is requested to generate the QoS STA statistic report frame when the value of the corresponding STA counter is greater than the thresholds defined in the corresponding subfields 311 to 317. The value of the corresponding STA counter is measured within the range of the total number of MSDUs given to the measurement count subfield 318.

The requesting STA hoping to receive the triggered report of the QoS counters can set one or more bits (one or more of B0 to B6) corresponding to the corresponding condition to "1" in the QoS STA counter triggering condition subfield 310 shown in FIG. 9 and can specify a predetermined threshold in the threshold subfield (a corresponding subfield of 311 to 317) corresponding to the bit set to "1" in the triggered reporting subfield 156*d* shown in FIG. 8. In this case, the group identifier subfield 156*c* shown in FIG. 5 is set to one of the QoS-associated group identifier values shown in Table 1.

Referring to FIG. 8, the measurement count subfield 318 includes information indicating the number of MSDUs (MAC Service Data Unit) used to determine whether the measured statistic is greater than the set threshold. The trigger timeout subfield 319 includes information indicating a time when the measuring STA does not generate an additional triggered QoS STA statistic report frame after the triggering condition is satisfied. The QoS threshold subfields 311 to 317 include a value indicating the number of MSDUs to be used as a threshold of the corresponding condition.

More specifically, the QoS failure threshold subfield 311 includes a value indicating the number of MSDUs to be used as the threshold of the QoS failure condition. The QoS failure threshold subfield 311 is valid only when the QoS failure bit (dot11QoSFailed) of the QoS STA counter triggering condition subfield 310 is set to "1".

The QoS retry threshold subfield 312 includes a value indicating the number of MSDUs to be used as the threshold of the QoS retry condition. The QoS retry threshold subfield 312 is valid only when the QoS retry bit (dot11QoSRetry) of the QoS STA counter triggering condition subfield 310 is set to "1".

The QoS multiple retry threshold subfield 313 includes a value indicating the number of MSDUs to be used as the threshold of the QoS multiple retry condition. The QoS multiple retry threshold subfield 313 is valid only when the QoS multiple retry bit (dot11QoSMultipleRetry) of the QoS STA counter triggering condition subfield 310 is set to "1".

The QoS frame duplicate threshold subfield 314 includes a value indicating the number of MSDUs to be used as the threshold of the QoS frame duplicate condition. The QoS frame duplicate threshold subfield 314 is valid only when the QoS frame duplicate bit (dot11QoSFrameDuplicate) of the QoS STA counter triggering condition subfield 310 is set to "1".

The QoS RTS failure threshold subfield 315 includes a value indicating the number of MSDUs to be used as the threshold of the QoS RTS failure condition. The QoS RTS failure threshold subfield 315 is valid only when the QoS RTS failure bit (dot11QoSRTSFailure) of the QoS STA counter triggering condition subfield 310 is set to "1".

The QoS ACK failure threshold subfield 316 includes a value indicating the number of MSDUs to be used as the threshold of the QoS ACK failure condition. The QoS ACK failure threshold subfield 316 is valid only when the QoS RTS failure bit (dot11QoSACKFailure) of the QoS STA counter triggering condition subfield 310 is set to "1".

The QoS discard threshold subfield 317 includes a value indicating the number of MSDUs to be used as the threshold of the QoS discard condition. The QoS discard threshold subfield 317 is valid only when the QoS discard bit (dot11QoSdiscarded) of the QoS STA counter triggering condition subfield 310 is set to "1".

In this embodiment, the format of the triggered QoS STA statistic request frame for the QoS STA counters is specifically subdivided and newly defined. By using the triggered QoS statistic request frame according to this embodiment, the requesting STA can specify one or more triggering conditions of the subdivided measurement elements for the QoS STA counters and can request the reporting STA for the statistics. Accordingly, according to this embodiment, it is possible to perform the specific and systematic triggered QoS STA statistic request and report procedures on the measurement elements for the QoS STA counters.

Triggered STA Statistic Request Procedure for RSNA Counters

Figure 10:
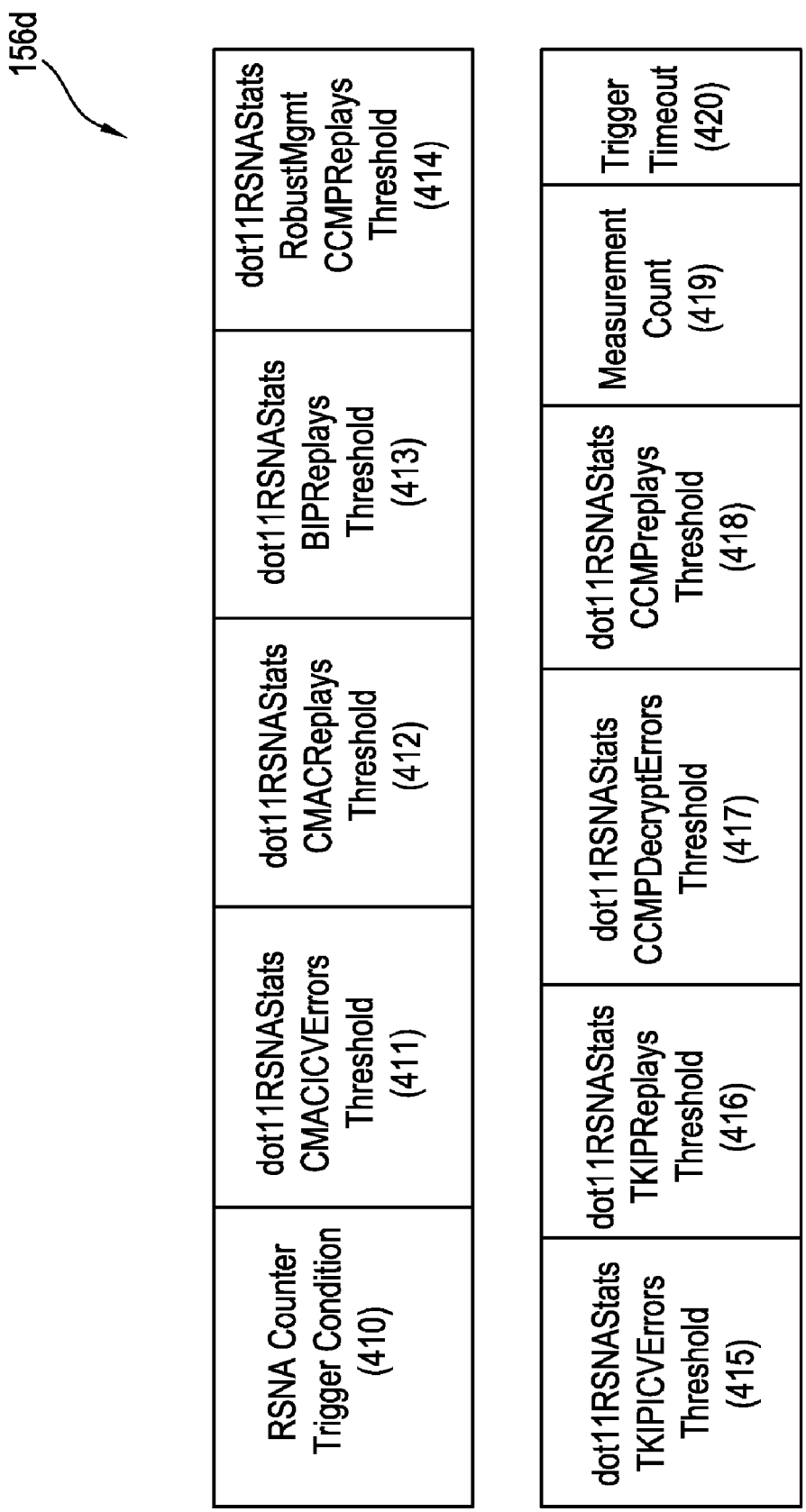
FIG. 10 is a diagram illustrating another example of the format of the triggered reporting subfield when the triggered radio measurement request frame shown in FIG. 5 is associated with a RSNA counter.

Another example of a format of the triggered reporting subfield 156d shown in FIG. 5 is shown in FIG. 10. In the triggered reporting subfield 156d having the format shown in FIG. 10, the group identifier unit 156c shown in FIG. 5 is set to a value (the group identifier value 11 in Table 1) corresponding to an RSNA STA counter.

Referring to FIG. 10, the triggered reporting subfield 156d includes an RSNA counter triggering condition subfield 410 (RSNA Counter Trigger Condition), a CMACICV error threshold subfield 411 (dot11RSNAStatsCMACICVErrors Threshold), a CMAC replay threshold subfield 412 (dot11RSNAStatsCMACReplays Threshold), a BIP replay threshold subfield 413 (dot11RSNAStatsBIPReplays Threshold), a CCMP replay threshold subfield 414 (dot11RSNAStatsRobustMgmtCCMPReplays Threshold), a TKIPICV error threshold subfield 415 (dot11RSNAStatsTKIPICVErrorsThreshold), a TKIP replay threshold subfield 416 (dot11RSNAStatsTKIPReplays Threshold), a CCMP decrypt error threshold subfield 417 (dot11RSNAStatsCCMPDecryptErrorsThreshold), a CCMP replay threshold subfield 418 (dot11RSNAStatsCCMPreplays Threshold), a measurement count subfield 419, and a trigger timeout subfield 420. Here, the threshold subfields 411 to 418 are arbitrary fields that are valid only when the corresponding bit in the RSNA counter triggering condition subfield 410 is set to "1".

The RSNA counter triggering condition subfield 410 is used to specify a condition triggering the reporting when requesting for a triggered RSNA statistic report. In the RSNA counter triggering condition subfield 410, one or more triggering conditions are set along with a specific threshold. The RSNA counter triggering condition subfield 410 can include plural bit-fields, a format of which is shown in FIG. 11. Referring to FIG. 11, the RSNA counter triggering condition subfield 410 includes a CMACICV error bit-field B0 (dot11RSNAStatsCMACICVErrors), a CMAC replay bit-field B1 (dot11RSNAStatsCMACReplays), a BIP replay bit-field B2 (dot11RSNAStatsBIPReplays), a CCMP replay bit-field B3 (dot11RSNAStatsRobustMgmtCCMPReplays), a TKIPICV error bit-field B4 (dot11RSNAStatsTKIPICVErrors), a TKIP replay bit-field B5 (dot11RSNAStatsTKIPReplays), a CCMP decrypt error bit-field B6 (dot11RSNAStatsCCMPDecryptErrors), and a CCMP replay bit-field B7 (dot11RSNAStatsCCMPreplays). The bits can be set to "0" or "1". When the bit is set to "0", it indicates that it is not necessary to report the corresponding triggering condition. On the contrary, when one or more bits are set to "1", it indicates that it is requested to report the corresponding triggering condition.

Accordingly, if the bits of the RSNA counter triggering condition subfield 410 are set to "1", it means that it is requested to generate the RSNA STA statistic report frame when the value of the corresponding RSNA error or failure counter is greater than the RSNA failure thresholds defined in the threshold subfields 411 to 418. The value of the corresponding RSNA error or failure counter is measured within the range of the total number of MSDUs given to the measurement count subfield 419.

The requesting STA hoping to receive the triggered report of the RSNA counters can set one or more bits (one or more of B0 to B7) corresponding to the corresponding condition to "1" in the RSNA counter triggering condition subfield 410 shown in FIG. 11 and can specify a predetermined threshold in the threshold subfield (a corresponding subfield of 411 to 418) corresponding to the bit set to "1" in the triggered reporting subfield 156d shown in FIG. 10. In this case, the group identifier subfield 156c shown in FIG. 5 is set to one of the RSNA-associated group identifier values shown in Table 1.

Referring to FIG. 10, the measurement count subfield 419 includes information indicating the number of MSDUs (MAC Service Data Unit) used to determine whether the measured statistic is greater than the set threshold. The trigger timeout subfield 420 includes information indicating a time when the measuring STA does not generate an additional triggered RSNA STA statistic report frame after the triggering condition is satisfied. The RSNA threshold subfields 411 to 418 include a value indicating the number of MSDUs to be used as a threshold of the corresponding condition.

More specifically, the CMACICV error threshold subfield 411 includes a value indicating the number of MSDUs to be used as the threshold of the RSNA statistic CMACICV error condition. The CMACICV error threshold subfield 411 is valid only when the CMACICV error bit (dotRSNAStatsCMACICVErrors) of the RSNA counter triggering condition subfield 410 is set to "1".

The CMA replay threshold subfield 412 includes a value indicating the number of MSDUs to be used as the threshold of the RSNA statistic CMA replay condition. The CMA replay threshold subfield 412 is valid only when the CMA replay bit (dotRSNAStatsCMACReplays) of the RSNA counter triggering condition subfield 410 is set to "1".

The BIP replay threshold subfield 413 includes a value indicating the number of MSDUs to be used as the threshold of the RSNA statistic BIP replay condition. The BIP replay threshold subfield 413 is valid only when the BIP replay bit (dotRSNAStatsBIPReplays) of the RSNA counter triggering condition subfield 410 is set to "1".

The CCMP replay threshold subfield 414 includes a value indicating the number of MSDUs to be used as the threshold of the RSNA statistic CCMP replay condition. The CCMP replay threshold subfield 414 is valid only when the CCMP replay bit (dotRSNAStatsRobustmgmtCCMPReplays) of the RSNA counter triggering condition subfield 410 is set to "1".

The TKIPICV error threshold subfield 415 includes a value indicating the number of MSDUs to be used as the threshold of the RSNA statistic TKIPICV error condition. The TKIPICV error threshold subfield 415 is valid only when the TKIPICV error bit (dotRSNAStatsTKIPICVErrors) of the RSNA counter triggering condition subfield 410 is set to "1".

The TKIP replay threshold subfield 416 includes a value indicating the number of MSDUs to be used as the threshold of the RSNA statistic TKIP replay condition. The TKIP replay threshold subfield 416 is valid only when the TKIP replay bit (dotRSNAStatsTKIPReplay) of the RSNA counter triggering condition subfield 410 is set to "1".

The CCMP decrypt error threshold subfield 417 includes a value indicating the number of MSDUs to be used as the threshold of the RSNA statistic CCMP decrypt error condition. The CCMP decrypt error threshold subfield 417 is valid only when the CCMP decrypt error bit (dotRSNAStatsCCMPDecryptErrors) of the RSNA counter triggering condition subfield 410 is set to "1".

The CCMP replay threshold subfield 418 includes a value indicating the number of MSDUs to be used as the threshold of the RSNA statistic CCMP replay condition. The CCMP replay threshold subfield 418 is valid only when the CCMP replay bit (dotRSNAStatsCCMPReplays) of the RSNA counter triggering condition subfield 410 is set to "1".

In this embodiment, the format of the triggered STA statistic request frame for the RSNA counters is specifically subdivided and newly defined. By using the triggered RSNA STA statistic request frame according to this embodiment, the requesting STA can specify one or more triggering conditions of the subdivided measurement elements for the RSNA counters and can request the reporting STA for the statistics. Accordingly, according to this embodiment, it is possible to perform the specific and systematic triggered RSNA STA statistic request and report procedures on the measurement elements for the RSNA counters.

Referring to FIG. 4 again, the requested STA or the reporting STA having received the STA statistic request message including the triggered reporting subfield, such as the triggered radio measurement request frame 100, measures the requested statistics, that is, the statistic elements specified in the triggered reporting subfield 156d (S42). The measurement is performed when the requested STA accepts the triggered STA statistic measurement request, and the triggered STA statistic measurement request once accepted is continuously valid until the requested STA or the measuring STA is disassociated or is successfully re-associated. The measurement procedure in the requested STA is performed within the number of MSDUs included in the measurement count subfields 218, 318, and 419 of the triggered reporting subfield 156d.

When the triggering condition is satisfied as the measurement result, the requested STA transmits the requested conditional STA report, that is, the STA statistic measurement report message, to the requesting STA (S43). The STA statistic measurement report message may be a frame including the STA statistic report elements as the measurement report elements. In this case, the STA statistic report message may be a radio measurement report frame.

The requested STA or the measuring STA having transmitted the STA statistic report message in response to the same triggered STA statistic request message does not additionally transmit the STA statistic report message until the trigger timeout period of the triggered STA statistic request message expires or until a new triggering condition is requested and the requested triggering condition is satisfied.

When a different STA statistic measurement request is received in the course of the measurement in response to the triggered STA statistic measurement report, the procedure for the triggered STA statistic measurement request in the course is stopped during the duration of the different STA statistic measurement request. Then, when the triggered STA statistic measurement request is restarted, the statistics previously counted are reset.

The STA statistics included in the STA statistic report transmitted step S43 are values accumulated over the transmitted number of MSDUs. The measurement duration is not used in the triggered STA statistic measurement request and report and the measurement duration included in the triggered measurement request frame and the triggered measurement report may be "0".

All the triggered STA statistic measurement procedures started by the requested STA or the measuring STA are ended by receiving the STA statistic request message in which the enable bit is set to "1" and the report bit is set to "0". The STA transmitting the triggered STA statistic request message can update the triggering condition by transmitting a new triggered STA statistic request message for specifying a new triggering condition.

Figure 12:
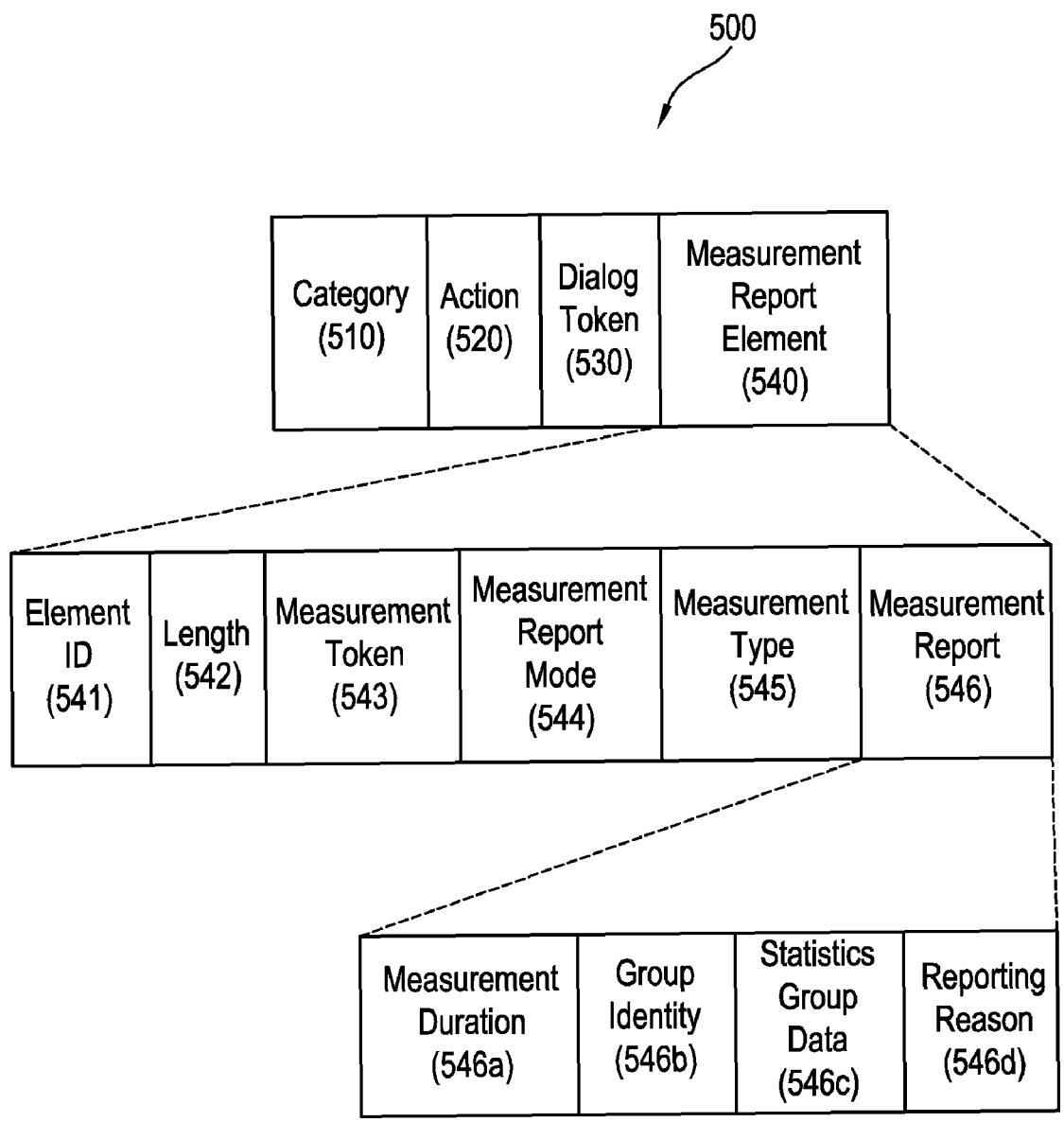
FIG. 12 is a diagram illustrating an example of a format of a triggered STA statistical report frame transmitted by a requested STA in step S43 of FIG. 4.

A block diagram illustrating an example of the format of the triggered STA statistic report frame transmitted by the requested STA in step S43 is shown in FIG. 12. The frame format shown in FIG. 12 employs an action frame body format.

Referring to FIG. 12, the triggered STA statistic report frame 500 includes a category field 510, an action field 520, a dialog token field 530, and a measurement report element field 540. The category field 510 is set to a value indicating a radio measurement category, similarly to the triggered STA statistic request frame 100. The action field 520 is set to a value indicating a measurement report. The dialog token field 530 is set to the same value as the dialog token field 130 of the triggered STA statistic request frame 100. Accordingly, the requesting STA can know to what request frame the received report frame 500 is a response.

The measurement report element field 540 includes one or more measurement report elements. The measurement report elements are collected by the reporting STA and includes a measurement report for the requested elements in which the triggering condition included in the triggered STA statistic request frame 100 is satisfied. The number and the lengths of the measurement report elements included in the triggered STA statistic report frame 500 are restricted by the size of the MMPDU (MAC Management Protocol Data Unit). The measurement request element field 540 includes an element ID subfield 541, a length subfield 542, a measurement token subfield 543, a measurement report mode subfield 544, a measurement type subfield 545, and a measurement report subfield 546.

The element ID subfield 541 is set to a value indicating the measurement report element. The value set in the length subfield 542 is variable and depends on the length of the measurement report subfield 546. The measurement token subfield 543 is set to a specific value other than 0 between the measurement report elements of the corresponding triggered STA statistic report frame 500. The measurement report mode subfield 544 is used to indicate specific reasons (such as delay, disable, and rejection) for the failed or rejected measurement request and includes one or more bits. The measurement type field 545 is set to a value for identifying the measurement report elements 540 and can be set a value indicating the STA statistic report in this embodiment.

The measurement report subfield 546 includes detailed measurement contents of the measurement type indicated by the measurement type subfield 545. The triggered STA statistic report frame 500 can include details of the collected or measured STA statistic result. For example, the measurement report subfield 546 is used to report changes of the requested statistic group data measured for the measurement duration. When the measurement duration is 0, the current value is reported instead of the changes of the statistic group data. The measurement report subfield 546 can include a measurement duration unit 546a, a group identifier unit 546b, a statistic group data unit 546c, and a reporting reason unit 546d.

The measurement duration unit 546a is set to a value indicating a time interval required for calculating the valued measured and included in the statistic group data unit 546c, which is a time interval required for the change of the statistic group data. However, when it is the triggered STA statistic report frame or the current statistic group data is reported, the measurement duration unit 546a can be set to 0. In the triggered reporting, the measurement duration unit 546a can be set to a predetermined value, for example, "65535".

The group identifier unit 546b is set to a value indicating the requested statistic group describing the statistic data included in the statistic group data unit 546c. An example of the value indicating the statistic group is shown in Table 1 and one or more statistic values collected or measured for each statistic group identifier is included in the statistic group data unit 546c. For example, when the value of the statistic group identifier is "11" indicating the RSNA counter, the returned statistic values are shown in Table 2.

TABLE 2

| Group Identifier Requested | Statistics Returned |
| --- | --- |
| 11 | dot11RSNAStatsCMACICVErrors (Counter32) |
|  | dot11RSNAStatsCMACReplays (Counter32) |
|  | dot11RSNAStatsBIPReplays (Counter32) |
|  | dot11RSNAStatsRobustMgmtCCMPReplays (counter32) |
|  | dot11RSNAStatsTKIPICVErrors (counter32) |
|  | dot11RSNAStatsTKIPReplays (counter32) |
|  | dot11RSNAStatsCCMPDecryptErrors (counter32) |
|  | dot11RSNAStatsCCMPReplays (counter32) |
| 12-255 | None |

The reporting reason unit 546d is a bit-field indicating a reason for transmission of the corresponding triggered STA statistic report frame 500 from the reporting STA. The reporting reason unit 546d is an arbitrary subfield which is valid only when the name of the statistic group indicated by the group identifier unit 546b is associated with a non-STA counter, a QoS counter, or an RSNA counter.

Triggered STA Statistic Report Procedure for STA counters

Figure 13:
FIG. 13 is a diagram illustrating an example of a format of a reporting reason unit shown in FIG. 12.

FIG. 13 is a block diagram illustrating an example of a format of the reporting reason unit 546d, where the group identifier unit 546b shown in FIG. 12 is set to a value (the group identifier value of 0 or 1 in Table 1) associated with the first and second STA counters. Referring to FIG. 13, the reporting reason unit 546d includes plural bit-fields indicating the reporting reason, such as a failure bit-field (dot11Failed) B0, an FCS error bit-field (dot11FCSError) B1, a multiple retry bit-field (dot11MulipleRetry) B2, a frame duplicate bit-field (dot11FrameDuplicate) B3, an RTS failure bit-field (dot11RTSFailure) B4, an ACK failure bit-field (dot11ACKFailure) B5, and a retry bit-field (dot11Retry) B6.

Triggered STA Statistic Report Procedure for QoS STA Counters

Figure 14:
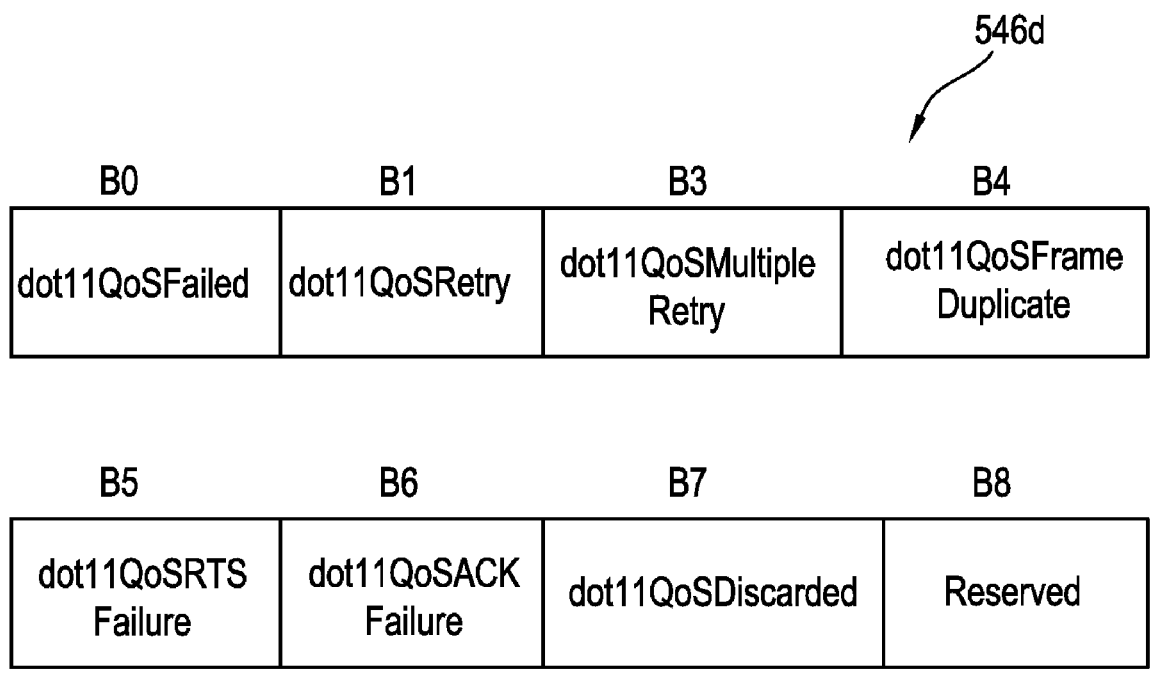
FIG. 14 is a diagram illustrating another example of the format of the reporting reason unit shown in FIG. 12.

Another example of the format of the reporting reason unit 546d in FIG. 12 is shown in FIG. 14. The unit having the format shown in FIG. 14 is set to a value (one group identifier value of 2 to 9 in Table 1) indicating that the group identifier value shown in FIG. 12 is associated with the QoS counters. Referring to FIG. 14, the reporting reason unit 546d includes plural bit-fields indicating the reporting reasons, such as a QoS failure bit-field (dot11QoSFailed) B0, a QoS retry bit-field (dot11QoSRetry) B1, a QoS multiple retry bit-field (dot11QoSMultipleRetry) B2, a QoS frame duplicate bit-field (dot11FrameDuplicate) B3, a QoS RTS failure bit-field (dot11QoSRTSFailure) B4, a QoS ACK failure bit-field (dot11QoSACKFailure) B5, and a QoS discard bit-field (dot11QoSDiscarded) B6.

Triggered STA Statistic Report Procedure for RSNA Counters

Another example of the format of the reporting reason unit 546d in FIG. 12 is shown in FIG. 15. The unit having the format shown in FIG. 15 is set to a value (the group identifier value of 11 in Table 1) indicating that the group identifier value shown in FIG. 12 is associated with the RSNA counters. Referring to FIG. 15, the reporting reason unit 546d includes plural bit-fields indicating the reporting reasons, such as a CMACICV error bit-field (dot11RSNAStatsCMACICVErrors) B0, a CMAC replay bit-field (dot11RSNAStatsCMACReplays) B1, a BIP replay bit-field (dot11RSNAStatsBIPReplays) B2, a CCMP replay bit-field (dot11RSNAStatsRobustMgmtCCMPReplays) B3, a TKIPICV error bit-field (dot11RSNAStatsTKIPICVErrors) B4, a TKIP replay bit-field (dot11RSNAStatsTKIPReplays) B5, a CCMP decrypt error bit-field (dot11RSNAStatsCCMPDecryptErrors) B6, and a CCMP replay bit-field (dot11RSNAStatsCCMPreplays) B7.

According to the invention, it is possible to permit smooth exchange of information on many kinds of STA statistical elements in a wireless communication system. Particularly, according to some aspects of the invention, it is possible to efficiently manage the wireless networks by defining the STA statistical elements on the basis of group identifier information specified in a STA statistical request frame.

In some aspects of the invention, since the STA statistical elements are specified in accordance with a protocol specified at the time of generating a frame, it is possible to efficiently generate and process frames.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A radio measurement method for measuring station statistics in a wireless communication network, the method comprising:
   transmitting a triggered station statistics measurements request message to a requested station, the triggered station statistics measurements request message including a group identity field and a triggered reporting field for quality of service (QoS) station counters, the group identity field indicating a requested QoS statistics group, and the triggered reporting field for QoS station counters being used to specify trigger conditions; and
   receiving a QoS station statistics measurements report message from the requested station when at least one of the trigger conditions occurs,
   wherein:
      the triggered reporting field comprises:
         a QoS station counters trigger condition subfield specifying reporting triggers and including one or more bit-fields for each one of the reporting triggers, and
         one or more QoS threshold subfields for specifying values representing a number of data units used as QoS threshold values for each of the reporting triggers;
      the one or more QoS threshold subfields includes at least a QoS failed threshold subfield, a QoS retry threshold subfield, a QoS multiple retry threshold subfield, a QoS frame duplicate threshold subfield, a QoS request to send (RTS) failure threshold subfield, a QoS acknowledgement (ACK) failure threshold subfield or a QoS discarded threshold subfield; and
      each of the one or more QoS threshold subfields is present when a particular bit field for each of the reporting triggers in the QoS station counters trigger condition subfield is set to 1.

2. The radio measurement method of claim 1, wherein the one or more bit-fields include at least a QoS failed bit-field, a QoS retry bit-field, a QoS multiple retry bit-field, a QoS frame duplicate bit-field, a QoS RTS failure bit-field, a QoS ACK failure bit-field or a QoS discarded bit-field.

3. The radio measurement method of claim 2, wherein the triggered reporting field further comprises:
a measurement count subfield specifying a number of data units for determining whether the at least one of the trigger conditions has occurred; and
a trigger timeout subfield comprising a time period during which the requested station does not generate a further triggered QoS station statistics measurements report message after the at least one of the trigger conditions have occurred.

4. The radio measurement method of claim 1, wherein:
the group identity field and the triggered reporting field are included in a measurement request of a measurement request element;
the measurement request element includes a measurement type set to a value identifying a station statistics request;
the measurement request element is included in a first radio measurement request frame; and
the first radio measurement request frame is a triggered QoS station statistics measurements request message.

5. The radio measurement method of claim 4, further comprising:
transmitting a second radio measurement request frame to the requested station, the second radio measurement request frame including new trigger conditions.

6. The radio measurement method of claim 4, wherein:
the QoS station statistics measurements report message is a radio measurement report frame including a measurement report element,
the measurement report element includes a measurement type and a measurement report;
the measurement type is set to a value identifying the measurement report;
the measurement report includes a reporting reason field; and
the reporting reason field is a bit field that indicates a reason for sending the QoS station statistics measurements report message by the requested station.

7. The radio measurement method of claim 4, wherein the group identity field is set to a value indicating at least QoS station counters for UP0 from a QoS counters table, QoS station counters for UP1 from the QoS counters table, QoS station counters for UP2 from the QoS counters table, QoS station counters for UP3 from the QoS counters table, QoS station counters for UP4 from the QoS counters table, QoS station counters for UP5 from the QoS counters table, QoS station counters for UP6 from the QoS counters table or QoS station counters for UP7 from the QoS counters table.

8. The radio measurement method of claim 4, wherein the measurement request includes a measurement duration field set to 0.

9. The radio measurement method of claim 4, wherein an enable bit in the measurement request element and a report bit in the measurement request element are each set to 1.

10. The radio measurement method of claim 9, further comprising:
transmitting a second radio measurement request frame to the requested station, the second radio measurement request frame including a QoS station statistics measurement request comprising an enable bit set to 1 and a report bit set to 0 such that the requested station terminates the triggered QoS station statistics measurements request message initiated by the first radio measurement request frame.

11. A radio measurement method for measuring station statistics in a wireless communication network, the method comprising:
receiving a triggered station statistics measurements request message from a requesting station, the triggered station statistics measurements request message including a group identity field and a triggered reporting field for quality of service (QoS) station counters, the group identity field indicating the requested QoS statistics group, and the triggered reporting field for QoS station counters being used to specify trigger conditions and QoS statistics thresholds;
measuring requested QoS station statistics; and
transmitting a QoS station statistics measurements report message to the requesting station when at least one of the trigger conditions occurs
wherein:
the triggered reporting field comprises:
a QoS station counters trigger condition subfield specifying reporting triggers and including one or more bit-fields for each one of the reporting triggers, and
one or more QoS threshold subfields for specifying values representing a number of data units used as QoS threshold values for each of the reporting triggers;
the one or more QoS threshold subfields includes at least a QoS failed threshold subfield, a QoS retry threshold subfield, a QoS multiple retry threshold subfield, a QoS frame duplicate threshold subfield, a QoS request to send (RTS) failure threshold subfield, a QoS acknowledgement (ACK) failure threshold subfield or a QoS discarded threshold subfield; and
each of the one or more QoS threshold subfields is present when a particular bit field for each of the reporting triggers in the QoS station counters trigger condition subfield is set to 1.

12. The radio measurement method of claim 11, wherein the one or more bit-fields include at least a QoS failed bit-field, a QoS retry bit-field, a QoS multiple retry bit-field, a QoS frame duplicate bit-field, a QoS RTS failure bit-field, a QoS ACK failure bit-field or a QoS discarded bit-field.

13. The radio measurement method of claim 12, wherein the triggered reporting field further comprises:
a measurement count subfield specifying a number of data units used for determining whether the at least one of the trigger conditions has occurred; and
a trigger timeout subfield including a time period during which the requested station does not generate a further triggered QoS station statistics measurements report message after the at least one of the trigger conditions has occurred.

14. The radio measurement method of claim 11, wherein:
the group identity field and the triggered reporting field are included in a measurement request of a measurement request;
the measurement request element includes a measurement type set to a value identifying a station statistics request;
the measurement request element is included in a first radio measurement request frame; and
the first radio measurement request frame a triggered station statistics measurements request message.

15. The radio measurement method of claim 14, wherein:
the measurement request further includes a measurement duration field set to 0; and
an enable bit in the measurement request and a report bit in the measurement request element are each set to 1.

16. The radio measurement method of claim 15, further comprising:

terminating a triggered QoS station statistics measurement initiated by the first radio measurement request frame when a second radio measurement request frame is received from the requesting station, the second radio measurement request frame including a QoS station statistics measurement request comprising an enable bit set to 1 and a report bit set to 0.

17. The radio measurement method of claim 14, further comprising:

updating the trigger conditions when a second radio measurement request frame is received from the requesting station, the second radio measurement request frame including new trigger conditions.

18. The radio measurement method of claim 11, wherein:

the QoS station statistics measurements report message is a radio measurement report frame that includes a measurement report element;

the measurement report element includes a measurement type and a measurement report, the measurement type set to a value identifying the measurement report;

the measurement report includes a reporting reason field; and the reporting reason field is a bit-field that indicates a reason for sending the QoS station statistics measurements report message.

19. The radio measurement method of claim 11, wherein:

the measured QoS station statistics comprise values accumulated over a number of transmitted or received data units before the at least one of the trigger conditions occurs.

20. A station for supporting a radio measurement method for measuring station statistics in a wireless communication network, the station comprising:

a processor configured to generate and process frames; and a transceiver operably connected to the processor and configured to transmit and receive the frames for the processor, wherein the transceiver is configured to:

transmit a request frame to a requested station for triggered quality of service (QoS) station statistics measurements, the request frame generated by the processor and including a group identity field and a triggered reporting field for QoS station counters, the group identity field indicating a requested QoS statistics group, and the triggered reporting field being used to specify trigger conditions; and receive a QoS station statistics measurements report message from the requested station when at least one of the trigger conditions occurs, wherein:

the triggered reporting field comprises:

a QoS station counters trigger condition subfield specifying reporting triggers and including one or more bit-fields for each one of the reporting triggers, and one or more QoS threshold subfields for specifying values representing a number of data units used as QoS threshold values for each of the reporting triggers;

the one or more QoS threshold subfields includes at least a QoS failed threshold subfield, a QoS retry threshold subfield, a QoS multiple retry threshold subfield, a QoS frame duplicate threshold subfield, a QoS request to send (RTS) failure threshold subfield, a QoS acknowledgement (ACK) failure threshold subfield or a QoS discarded threshold subfield; and each of the one or more QoS threshold subfields is present when a particular bit field for each of the reporting triggers in the QoS station counters trigger condition subfield is set to 1.

* * * * *